(12) United States Patent
Reynolds et al.

(10) Patent No.: US 11,885,234 B2
(45) Date of Patent: Jan. 30, 2024

(54) SYSTEM AND METHOD FOR TURBOMACHINE WITH LOCAL VORTEX GENERATOR ARRAY

(71) Applicant: HONEYWELL INTERNATIONAL INC., Charlotte, NC (US)

(72) Inventors: Bruce D. Reynolds, Phoenix, AZ (US); John Repp, Phoenix, AZ (US)

(73) Assignee: HONEYWELL INTERNATIONAL INC., Charlotte, NC (US)

(*) Notice: Subject to any disclaimer, the term of this patent is extended or adjusted under 35 U.S.C. 154(b) by 6 days.

(21) Appl. No.: 17/444,065

(22) Filed: Jul. 30, 2021

(65) Prior Publication Data
US 2023/0036499 A1    Feb. 2, 2023

(51) Int. Cl.
*F01D 5/14*    (2006.01)
*F01D 5/22*    (2006.01)
*F01D 9/04*    (2006.01)

(52) U.S. Cl.
CPC ............ *F01D 5/145* (2013.01); *F01D 5/225* (2013.01); *F01D 9/041* (2013.01); *F05D 2220/323* (2013.01); *F05D 2240/124* (2013.01); *F05D 2240/127* (2013.01)

(58) Field of Classification Search
CPC .......... F01D 5/145; F01D 5/225; F01D 9/041; F05D 2240/124; F05D 2240/127
See application file for complete search history.

(56) References Cited

U.S. PATENT DOCUMENTS

| | | | |
|---|---|---|---|
| 5,598,990 A | 2/1997 | Farokhi et al. | |
| 7,748,958 B2 | 7/2010 | McVeigh et al. | |
| 8,814,529 B2 | 8/2014 | Fiala et al. | |
| 9,416,665 B2* | 8/2016 | Xu | F01D 5/186 |
| 9,726,197 B2 | 8/2017 | Perrot et al. | |
| 10,808,540 B2* | 10/2020 | Eastwood | F01D 5/145 |
| 2013/0330184 A1 | 12/2013 | Sparks | |
| 2016/0052621 A1 | 2/2016 | Ireland et al. | |
| 2017/0030209 A1* | 2/2017 | Burdgick | F01D 9/041 |
| 2018/0023395 A1 | 1/2018 | Jones et al. | |

FOREIGN PATENT DOCUMENTS

| | | | |
|---|---|---|---|
| CN | 109441554 A | 3/2019 | |
| EP | 1847682 A1 * | 10/2007 | ............. F01D 5/145 |
| EP | 3483395 A2 | 5/2019 | |
| EP | 3940199 A1 | 1/2022 | |

OTHER PUBLICATIONS

Translation of EP-1847682-A1 (Year: 2007).*

* cited by examiner

*Primary Examiner* — Courtney D Heinle
*Assistant Examiner* — Danielle M. Christensen
(74) *Attorney, Agent, or Firm* — LORENZ & KOPF, LLP

(57) ABSTRACT

A turbomachine includes a shroud and a hub spaced apart from the shroud to channel an airflow along a direction. The turbomachine includes a plurality of airfoils coupled between the shroud and the hub. At least one airfoil of the plurality of airfoils includes a leading edge spaced apart from a trailing edge in the direction of the airflow and a pressure side opposite a suction side. The turbomachine includes at least one local vortex generator array defined on the suction side so as to extend onto the hub or the shroud. The at least one local vortex generator array is defined downstream of the leading edge.

18 Claims, 14 Drawing Sheets

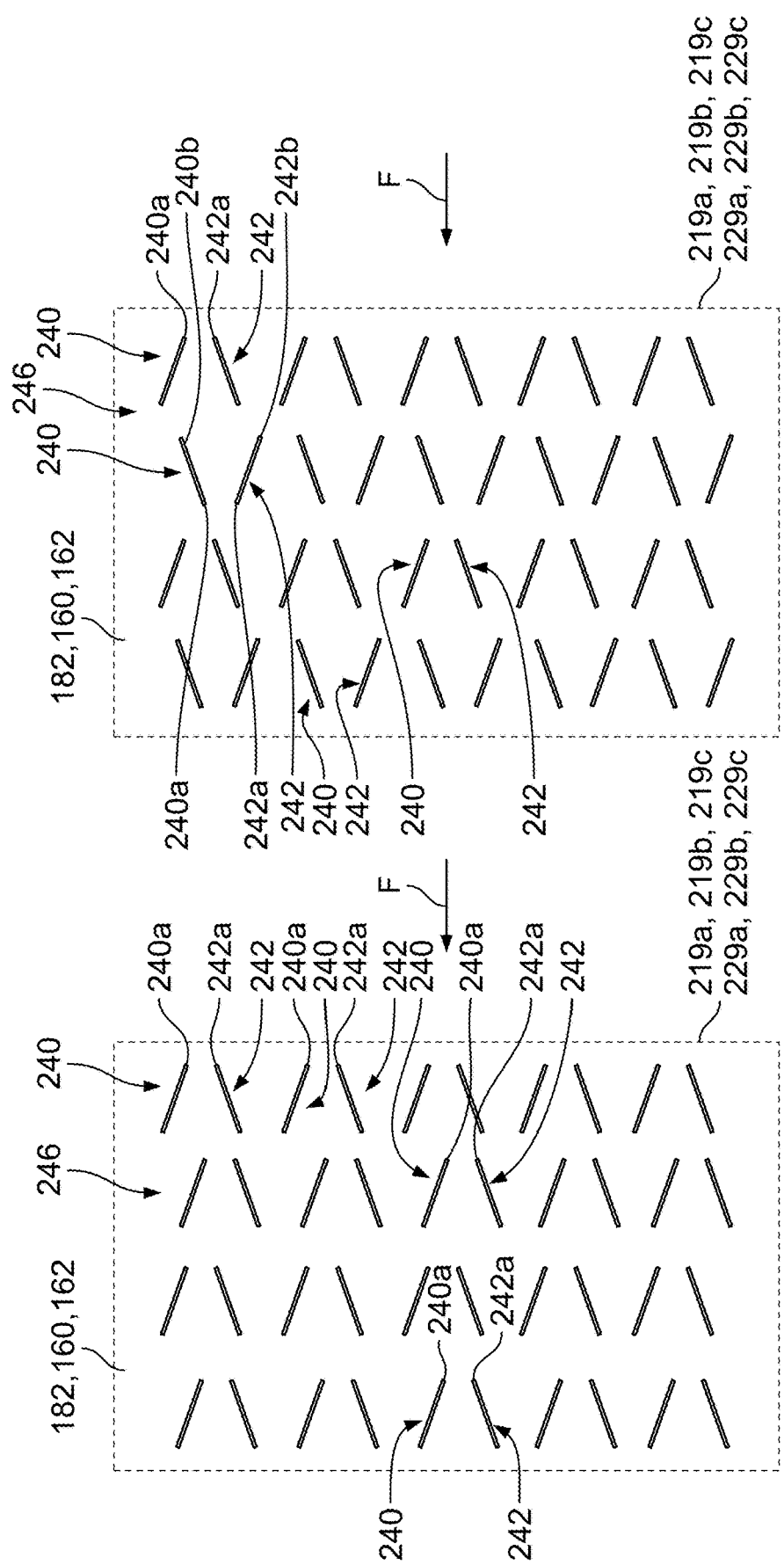

US 11,885,234 B2

SYSTEM AND METHOD FOR TURBOMACHINE WITH LOCAL VORTEX GENERATOR ARRAY

TECHNICAL FIELD

The present disclosure generally relates to turbomachines, and more particularly relates to a system and method for a turbomachine with a local vortex generator array.

BACKGROUND

Turbomachines, such as gas turbine engines, may be employed to power various devices. For example, a gas turbine engine may be employed to power a mobile platform, such as an aircraft. Generally, gas turbine engines include a fan and a compressor section, which cooperate to draw air into the gas turbine engine and sequentially raise the pressure of the air. In order to increase performance of the gas turbine engine, it is desirable to increase cycle pressure ratios of one or more stages associated with the compressor section. The one or more stages of the compressor section each generally include a rotor and a stator. The increase in cycle pressure ratios results in increased aerodynamic loading in the stator of the one or more stages of the compressor section, and may result in pressure losses and increased flow deviation in the stator. An increase in pressure losses and an increase in flow deviation in the stator results in reduced efficiency of the compressor section, and may result in increased specific fuel consumption and increased turbine operating temperatures.

Accordingly, it is desirable to provide a turbomachine, such as a gas turbine engine, in which pressure losses and flow deviation are minimized to enable increased aerodynamic loading in the fan and compressor section. It is also desirable to provide a turbomachine that includes a local vortex generator array associated with the stator to reduce pressure losses and flow deviation. Furthermore, other desirable features and characteristics of the present invention will become apparent from the subsequent detailed description and the appended claims, taken in conjunction with the accompanying drawings and the foregoing technical field and background.

SUMMARY

According to various embodiments, provided is a turbomachine. The turbomachine includes a shroud, and a hub spaced apart from the shroud. The hub and the shroud are configured to channel an airflow along a direction. The turbomachine includes a plurality of airfoils coupled between the shroud and the hub. At least one airfoil of the plurality of airfoils includes a leading edge spaced apart from a trailing edge in the direction of the airflow and a pressure side opposite a suction side. The turbomachine includes at least one local vortex generator array defined on the suction side so as to extend onto the hub or the shroud. The at least one local vortex generator array is defined downstream of the leading edge.

The at least one local vortex generator array includes at least a plurality of first flow features and a plurality of second flow features arranged in pairs. The plurality of first flow features and the plurality of second flow features extend outwardly into the airflow from the suction side, the hub, or the shroud. The plurality of first flow features and the plurality of second flow features are recessed into the suction side, the hub, or the shroud. The plurality of first flow features and the plurality of second flow features are arranged in a repeatable pattern. The plurality of first flow features and the plurality of second flow features are arranged in an alternating pattern. The at least one local vortex generator array comprises a first local vortex generator array defined on the suction side and the shroud, and a second local vortex generator array defined on the suction side and the hub. The at least one airfoil includes a fillet defined at the suction side and the shroud, and a second fillet defined at the suction side and the hub, and the first local vortex generator array is discontinuous at the fillet and the second vortex generator array is discontinuous at the second fillet. The at least one airfoil has a span defined as 0% at the hub and 100% at the shroud, and the first local vortex generator array is defined on the suction side between greater than or equal to 60% span and 100% span. The second local vortex generator array is defined on the suction side between 0% span and less than or equal to 40% span. The at least one airfoil has a chord that is 0% chord at the leading edge and 100% chord at the trailing edge, and the first local vortex generator array is defined on the suction side between 1% chord to 50% chord. The first local vortex generator array is defined on the shroud between 0% chord to -10% chord at 100% span. The at least one airfoil has a chord that is 0% chord at the leading edge and 100% chord at the trailing edge, and the second local vortex generator array is defined on the suction side between 1% chord to 50% chord and is defined on the hub between 0% chord to -10% chord at 0% span. A distance is defined between adjacent ones of the plurality of airfoils along the shroud and a second distance is defined between the adjacent ones of the plurality of airfoils along the hub, and the first local vortex generator array extends along the shroud from the suction side of the at least one airfoil for 60% of the distance and the second local vortex generator array extends along the hub from the suction side of the at least one airfoil for 60% of the second distance. The first local vortex generator array extends along the shroud from the pressure side of the at least one airfoil for 20% of the distance and the second local vortex generator array extends along the hub from the pressure side of the at least one airfoil for 20% of the second distance.

Also provided is a method for manufacturing a stator for a turbomachine, in which the stator includes at least one local vortex generator array, and the method includes receiving, by a processor, design criteria for the stator. The stator includes a shroud, a hub, and a plurality of airfoils that each extend between the shroud and the hub in the spanwise direction, at least one airfoil of the plurality of airfoils including a leading edge spaced apart from a trailing edge in a chordwise direction and a pressure side opposite a suction side. The method includes receiving, by the processor, a shape, and a location of the at least one local vortex generator array defined on the suction side of the at least one airfoil and at least one of the hub and the shroud. The method includes determining, by the processor, whether the shape and location of the at least one local vortex generator array defined on the suction side of the at least one airfoil and the at least one of the hub and the shroud meets the design criteria for the stator; and manufacturing the stator including the at least one local vortex generator array based on the determining.

The method includes receiving, by the processor, empirical evaluation data that provides an aerodynamic benefit associated with the at least one local vortex generator array; and wherein the determining, by the processor, whether the shape and location of the at least one local vortex generator array defined on the suction side of the at least one airfoil and the at least one of the hub and the shroud meets the design criteria for the stator is based on the aerodynamic benefit. The at least one local vortex generator array further comprises a first local vortex generator array defined on the suction side of the at least one airfoil and the shroud and a second local vortex generator array defined on the suction side of the at least one airfoil and the hub, and wherein receiving, by the processor, the shape and location of the at least one local vortex generator array further comprises: receiving, by the processor, a location of the first local vortex generator array on the suction side as between 1% chord to 50% chord in the chordwise direction and between greater than or equal to 60% span and 100% span in the spanwise direction; and receiving, by the processor, a location of the second local vortex generator array on the suction side as between 1% chord to 50% chord in the chordwise direction and between less than or equal to 40% span and 0% span in the spanwise direction. The receiving, by the processor, the shape and location further comprises: receiving, by the processor, a location of the first local vortex generator array on the shroud as between 0% chord to −10% chord in the chordwise direction at 100% span and up to 60% of a distance defined on the shroud from the suction side of the at least one airfoil to an adjacent airfoil of the plurality of airfoils; and receiving, by the processor, a location of the second local vortex generator array on the hub as between 0% chord to −10% chord in the chordwise direction at 0% span and up to 60% of a second distance defined on the hub from the suction side of the at least one airfoil to the adjacent airfoil of the plurality of airfoils. The receiving, by the processor, the shape and location further comprises: receiving, by the processor, a location of the first local vortex generator array on the shroud as between 0% chord to −10% chord in the chordwise direction at 100% span and up to 20% of a distance defined on the shroud from the pressure side of the at least one airfoil to an adjacent airfoil of the plurality of airfoils; and receiving, by the processor, a location of the second local vortex generator array on the hub as between 0% chord to −10% chord in the chordwise direction at 0% span and up to 20% of a second distance defined on the hub from the pressure side of the at least one airfoil to the adjacent airfoil of the plurality of airfoils.

DESCRIPTION OF THE DRAWINGS

The exemplary embodiments will hereinafter be described in conjunction with the following drawing figures, wherein like numerals denote like elements, and wherein:

FIG. 4D is a detail view of an exemplary first flow structure and second flow structure associated with the first local vortex generator array and the second local vortex generator array taken normal to a surface, which in this example is the surface of the suction side;

FIG. 4E is a detail view of an exemplary first flow structure and second flow structure associated with the first local vortex generator array and the second local vortex generator array taken normal to a surface, which in this example is the surface of the suction side;

DETAILED DESCRIPTION

Figure 1:
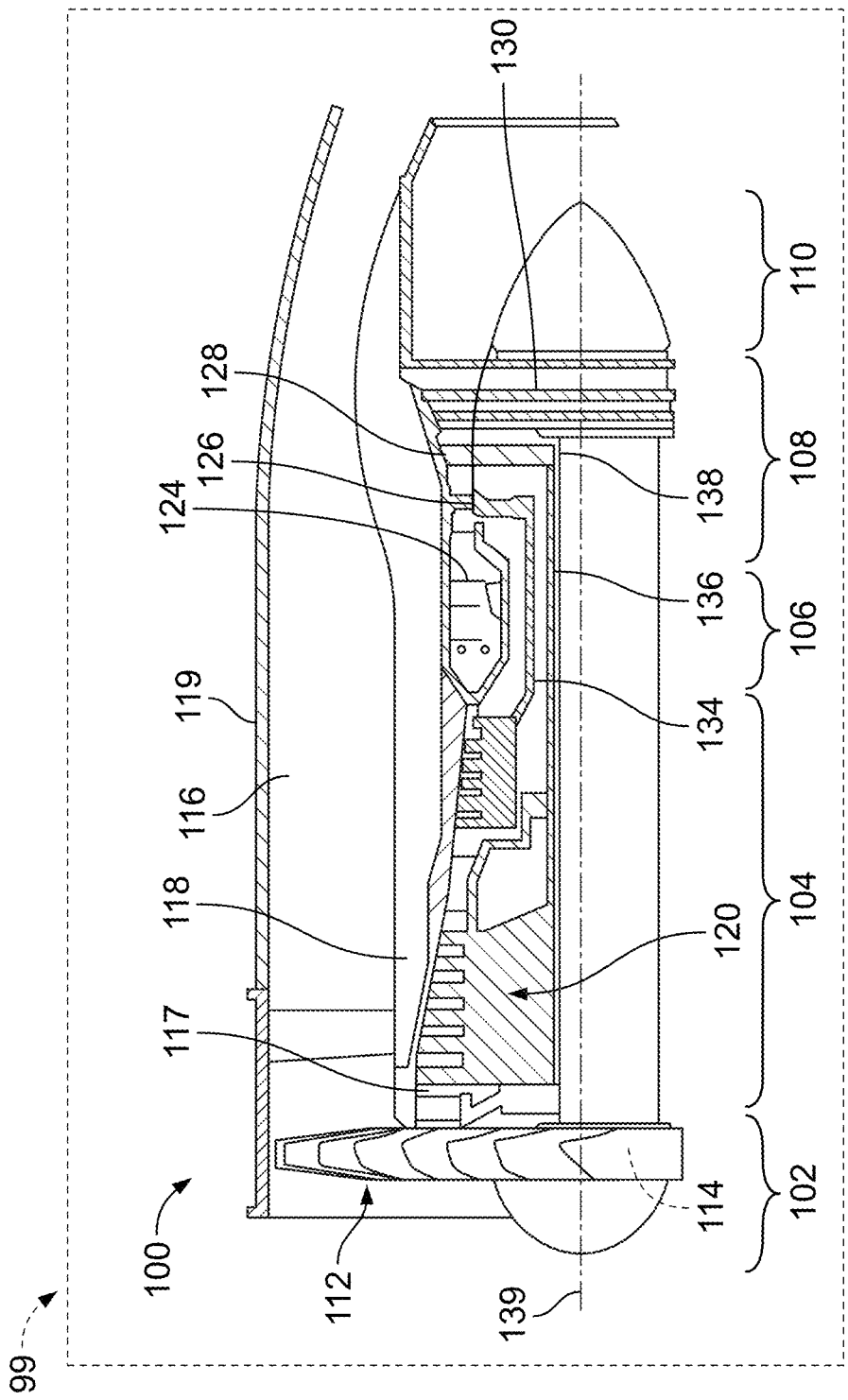
FIG. 1 is a schematic cross-sectional illustration of a turbomachine, such as a gas turbine engine, which includes at least one exemplary local vortex generator array defined on a stator associated with a compressor section of the gas turbine engine in accordance with the various teachings of the present disclosure.

The following detailed description is merely exemplary in nature and is not intended to limit the application and uses. Furthermore, there is no intention to be bound by any expressed or implied theory presented in the preceding technical field, background, brief summary or the following detailed description. In addition, those skilled in the art will appreciate that embodiments of the present disclosure may be practiced in conjunction with any type of device that would benefit from a local vortex generator array, and that the stator of a compressor stage described herein for use with a turbomachine, such as a gas turbine engine, is merely one exemplary embodiment according to the present disclosure. Moreover, while the local vortex generator array is described herein as being used with a stator of a compressor section associated with a turbomachine, such as a gas turbine engine onboard a mobile platform, such as a bus, motorcycle, train, motor vehicle, marine vessel, aircraft, rotorcraft and the like, the various teachings of the present disclosure can be used with a turbomachine or gas turbine engine on a stationary platform. Further, it should be noted that many alternative or additional functional relationships or physical connections may be present in an embodiment of the present disclosure. In addition, while the figures shown herein depict an example with certain arrangements of elements, additional intervening elements, devices, features, or components may be present in an actual embodiment. It should also be understood that the drawings are merely illustrative and may not be drawn to scale.

As used herein, the term "axial" refers to a direction that is generally parallel to or coincident with an axis of rotation, axis of symmetry, or centerline of a component or components. For example, in a cylinder or disc with a centerline and generally circular ends or opposing faces, the "axial" direction may refer to the direction that generally extends in parallel to the centerline between the opposite ends or faces. In certain instances, the term "axial" may be utilized with respect to components that are not cylindrical (or otherwise radially symmetric). For example, the "axial" direction for a rectangular housing containing a rotating shaft may be viewed as a direction that is generally parallel to or coincident with the rotational axis of the shaft. Furthermore, the term "radially" as used herein may refer to a direction or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominately in the respective nominal axial or radial direction. Furthermore, the term "tangential" as used herein may refer to a direction or a relationship of a component that is perpendicular or normal to the axial and radial directions in a turbomachine in a cylindrical coordinate system. As used herein, the term "about" denotes within 5% (positive or negative) of a given value to account for manufacturing tolerances.

As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of schematic, functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the system described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

With reference to FIG. 1, a partial, cross-sectional view of an exemplary turbomachine, such as a gas turbine engine 100, is shown with the remaining portion of the gas turbine engine 100 being axisymmetric about a longitudinal axis 139, which also comprises an axis of rotation for the gas turbine engine 100. In the depicted embodiment, the gas turbine engine 100 is an annular multi-spool turbofan gas turbine jet engine within an aircraft 99, although other arrangements and uses may be provided. In this example, the gas turbine engine 100 includes fan section 102, a compressor section 104, a combustor section 106, a turbine section 108, and an exhaust section 110. The fan section 102 includes a fan 112 having fan blades coupled to a rotor disk 114 that draw air into the gas turbine engine 100 and increase a pressure of the air. A fraction of the increased pressure air exhausted from the fan 112 is directed through an outer (or first) bypass duct 116 and the remaining fraction of air exhausted from the fan 112 is directed into the compressor section 104 along a core flowpath 117. The outer bypass duct 116 is generally defined by an inner casing 118 and an outer casing 119. The compressor section 104 includes one or more stages 120, which will be discussed in greater detail below. The compressor section 104 sequentially raises the pressure of the air and directs a majority of the high pressure air into the combustor section 106. A fraction of the compressed air bypasses the combustor section 106 and is used to cool, among other components, turbine blades in the turbine section 108.

In the combustor section 106, which includes a combustion chamber 124, the high pressure air is mixed with fuel, which is combusted. The high-temperature combustion air is directed into the turbine section 108. In this example, the turbine section 108 includes three turbines disposed in axial flow series, namely, a high pressure turbine 126, an intermediate pressure turbine 128, and a low pressure turbine 130. However, it will be appreciated that the number of turbines, and/or the configurations thereof, may vary. In this embodiment, the high-temperature air from the combustor section 106 expands through and rotates each turbine 126, 128, and 130. As the turbines 126, 128, and 130 rotate, each drives equipment in the gas turbine engine 100 via concentrically disposed shafts or spools. In one example, the high pressure turbine 126 and the intermediate pressure turbine 128 drives the stages 120 in the compressor section 104 via shafts 134, 136, and the low pressure turbine 130 drives the fan 112 via a shaft 138.

Figure 2:
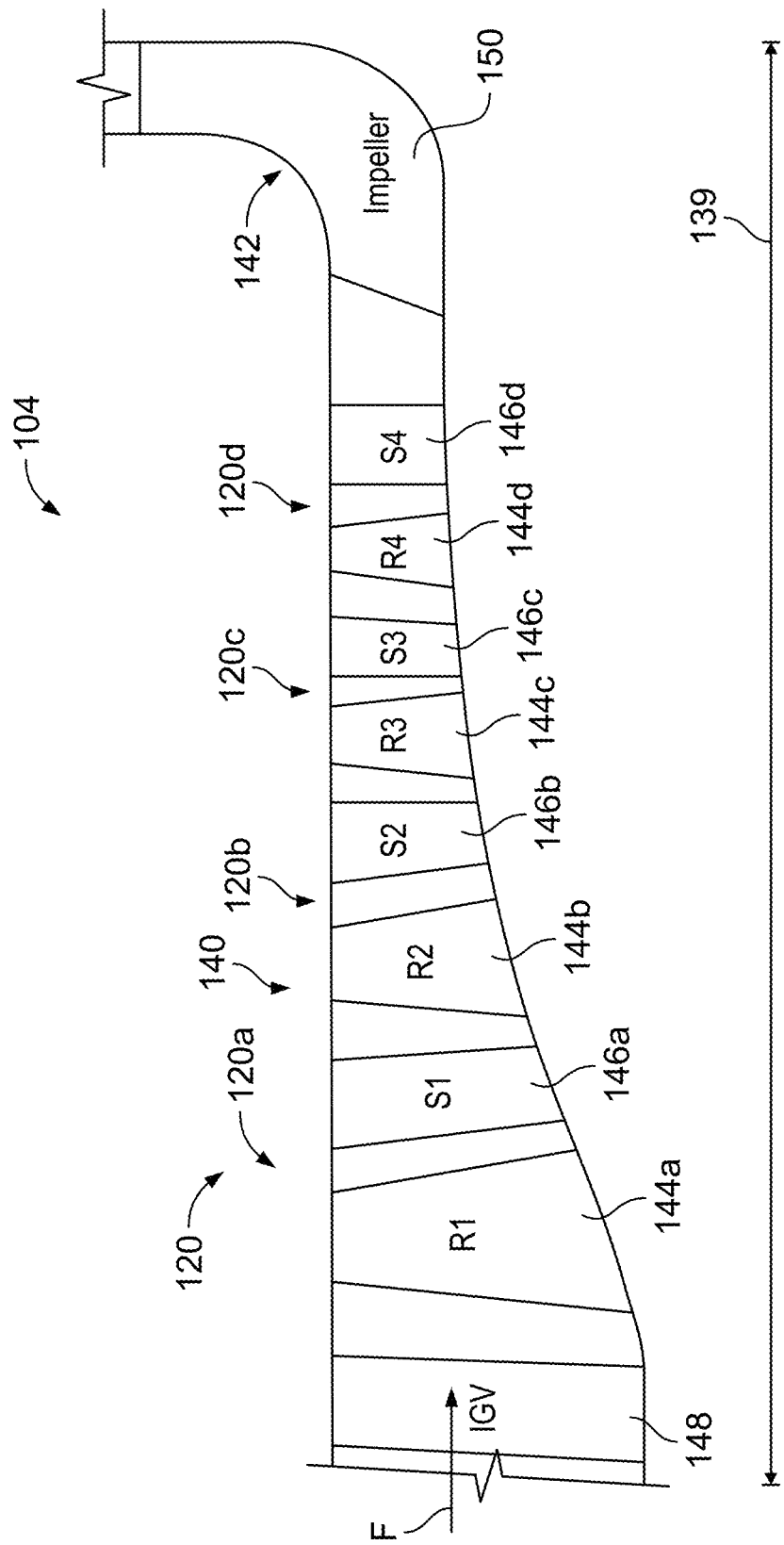
FIG. 2 is a schematic meridional sectional view through the compressor section of FIG. 1.

With reference to FIG. 2, a meridional sectional view through the compressor section 104 is shown. In this example, the compressor section 104 includes an axial compressor section 140 and a centrifugal compressor section 142. The axial compressor section 140 includes one or more rotors 144 and one or more stators 146 arranged in one or more stages 120 in an axial direction along the centerline or longitudinal axis 139. In one example, the axial compressor section 140 comprises a four stage axial compressor. It should be noted, however, that the axial compressor section 140 can include a number of stages 120, and thus, the number of stages illustrated and described herein is merely exemplary. In this example, the one or more rotors 144 includes four rotors 144a-144d and the one or more stators 146 includes four stators 146a-146d. The four rotors 144a-144d and the four stators 146a-146d cooperate to define the four stages 120a-120d of the axial compressor section 140, with rotor 144a and stator 146a forming a first stage 120a; rotor 144b and stator 146b forming a second stage 120b; rotor 144c and stator 146c forming a third stage 120c; and rotor 144d and stator 146d forming a fourth stage 120d. As will be discussed herein, one or more of the stators 146a-146d include a local vortex generator array 200 (FIG. 3), which is defined on or integrally formed with the one or more of the stators 146a-146d.

The axial compressor section 140 also includes an inlet guide vane system 148, which is upstream from the first stage 120a. The centrifugal compressor section 142 includes an impeller 150, and may also include a diffuser and a deswirl section (not shown). Since the inlet guide vane system 148, the rotors 144a-144d, the impeller 150 and the diffuser and deswirl section are generally known in the art, they will not be discussed in great detail herein.

Figure 3:
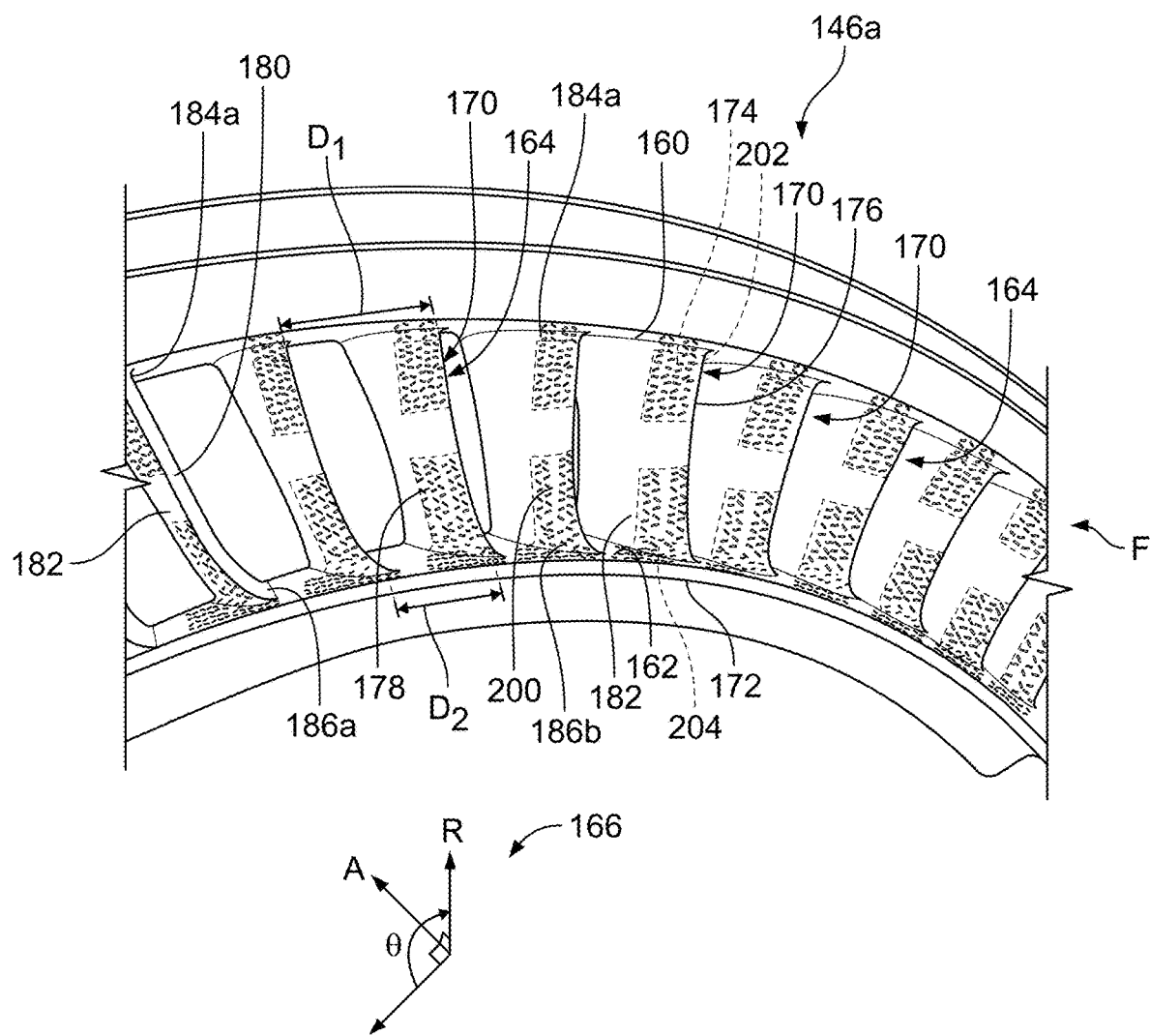
FIG. 3 is a perspective view of a portion of a stator that includes the at least one local vortex generator array.

With reference to FIG. 3, a portion of the stator 146a is shown. As the stators 146a-146d are substantially similar, the stator 146a of the stators 146a-146d will be described herein, with the understanding that the remainder of the stators 146b-146d are substantially similar or may be the same. The stator 146a is generally axisymmetric about the centerline, rotational or longitudinal axis 139 of gas turbine engine 100. The stator 146a is downstream from the inlet guide vane system 148 (FIG. 2). In this example, the stator 146a includes an outer annular shroud 160 and an inner annular hub 162, which are substantially concentric and radially spaced. The shroud 160 and the hub 162 bound outer and inner peripheries of a portion of the flow path of the fluid F through the stator 146a. The stator 146a also includes a number of stationary vanes 164, one of which can be seen in FIG. 4. The vanes 164 are arranged in an annular array, which is defined between the shroud 160 and the hub 162. Each vane 164 extends between the shroud 160 and the hub 162 in a different radial direction similar to the spokes of a wheel; the radial direction is a direction extending perpendicular to a centerline of the stator 146a, which corresponds to the R-axis of coordinate legend 166. The axial direction is a direction perpendicular to the radial direction and parallel to the centerline or longitudinal axis 139 of the gas turbine engine 100, and thus, the stator 146a, which corresponds to the A-axis of the coordinate legend 166. The shroud 160 and the hub 162 also extend in a tangential or circumferential direction, which corresponds to θ on the coordinate legend 166.

Each vane 164 includes an airfoil 170, an inner end 172, and an outer end 174. The inner end 172 is coupled to or integrally formed with the hub 162, and the outer end 174 is coupled to or integrally formed with the shroud 160. The airfoil 170 includes a leading edge 176, a trailing edge 178, a pressure side 180, and a suction side 182 opposite the pressure side 180. The pressure side 180 is generally concave, while the suction side 182 is generally convex. In one example, the stator 146a is a monolithic or unitary ring, however, in other embodiments, the stator 146a may be composed of segments that are assembled to form a full ring. At least one of the local vortex generator arrays 200 is defined on a portion of the suction side 182 of each vane 164 to extend onto the shroud 160, the hub 162 or both the shroud 160 and the hub 162. In this example, each vane 164 includes a first local vortex generator array 202 defined on the suction side 182 and the shroud 160, and a second local vortex generator array 204 defined on the suction side 182 and the hub 162. In this example, each vane 164 includes the first local vortex generator array 202 defined on the suction side 182 and the shroud 160, and the second local vortex generator array 204 defined on the suction side 182 and the hub 162; however, in other examples, the stator 146a may be configured such that every other one of the vanes 164 includes the first local vortex generator array 202 and the second local vortex generator array 204, if desired. Thus, generally, while the first local vortex generator array 202 and the second local vortex generator array 204 are defined on each airfoil 170 of each vane 164 of the stator 146a, the first local vortex generator array 202 and the second local vortex generator array 204 may be defined as desired on one or more of the vanes 164 to control boundary layer growth and minimize secondary losses to enable increased cycle pressure ratios as the air flows through the stator 146a-146d. The first local vortex generator array 202 and the second local vortex generator array 204 are each integrally formed with the airfoil 170 and the respective one of the shroud 160 and the hub 162.

In certain embodiments, fillets 184a, 184b may be defined along the interface of the vane 164 with the shroud 160; and second fillets 186a, 186b may be defined along the interface of the vane 164 with the hub 162. The fillets 184a, 184b provide a smooth transition between the airfoil 170 and the shroud 160, and the second fillets 186a, 186b provide a smooth transition between the airfoil 170 and the hub 162, which reduce stress where the surfaces meet. The fillets 184a, 186a are defined at the interface along the pressure side 180, and the fillets 184b, 186b are defined at the interface along the suction side 182. It should be noted that in certain embodiments, the airfoil 170 may be devoid of one or more of the fillets 184a, 184b, 186a, 186b.

Figure 4:
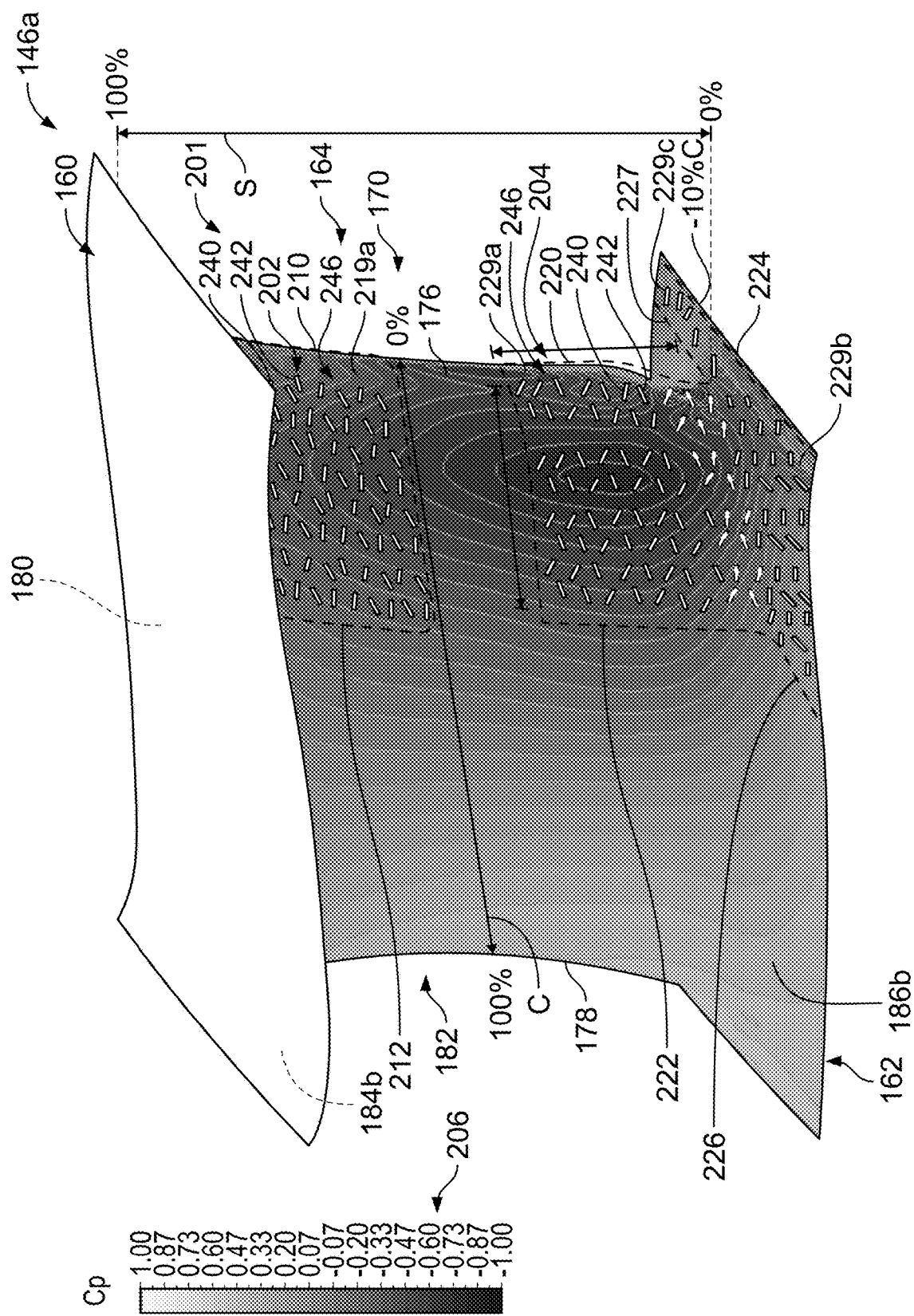
FIG. 4 is a detail schematic environmental view of a shroud, a hub, and a vane of the stator, which illustrates a coefficient of static pressure associated with the shroud, the hub, and the vane, and includes a first flow structure and a second flow structure of a first local vortex generator array and a second local vortex generator array of the at least one local vortex generator array defined on the shroud, the hub, and the vane.
Figure 4A:
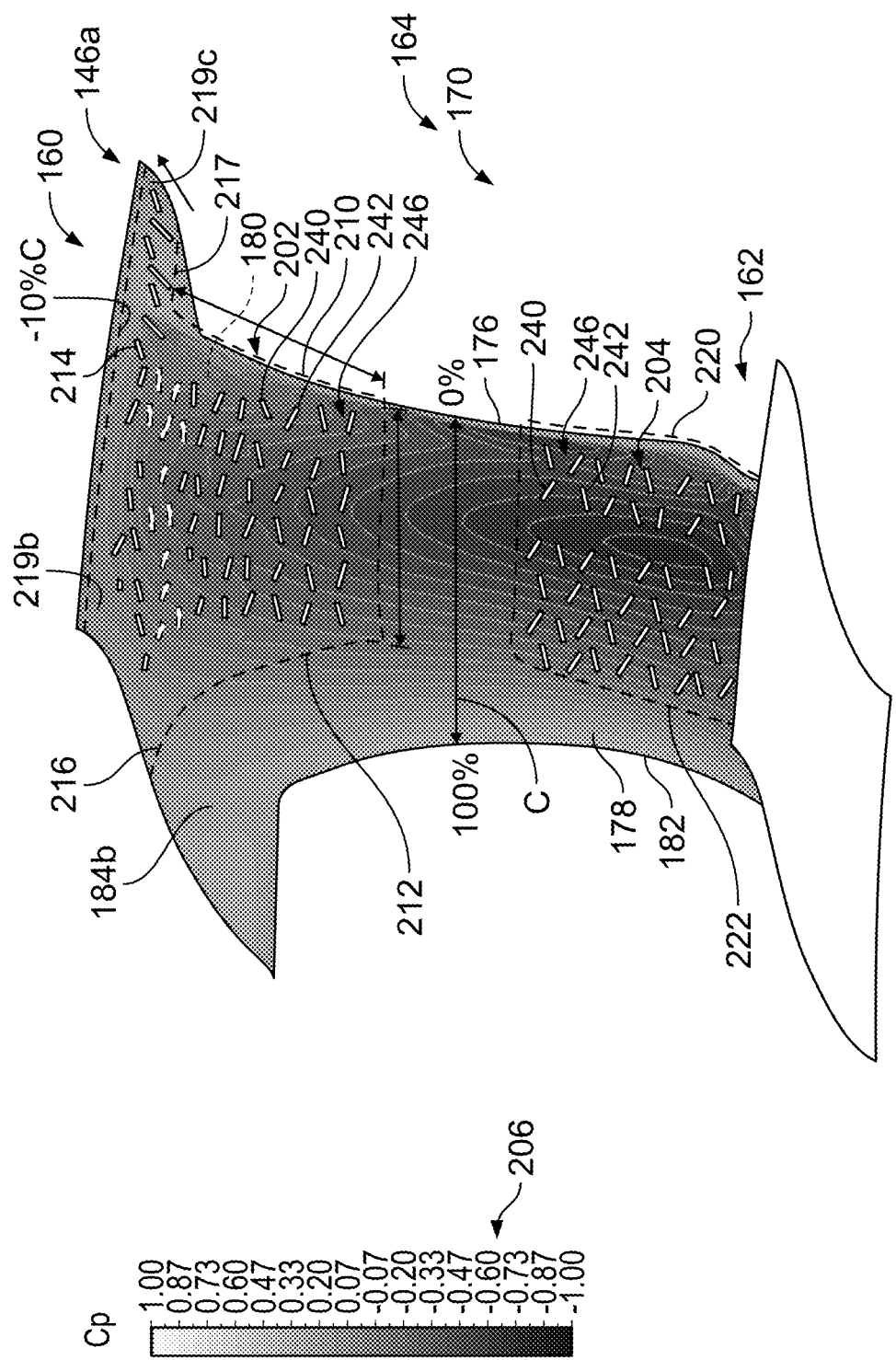
FIG. 4A is a detail schematic environmental view of the shroud, the hub, and the vane of the stator, which illustrates the coefficient of static pressure associated with the shroud, the hub, and the vane, and is rotated to illustrate the first local vortex generator array defined on the shroud.
Figure 4B:
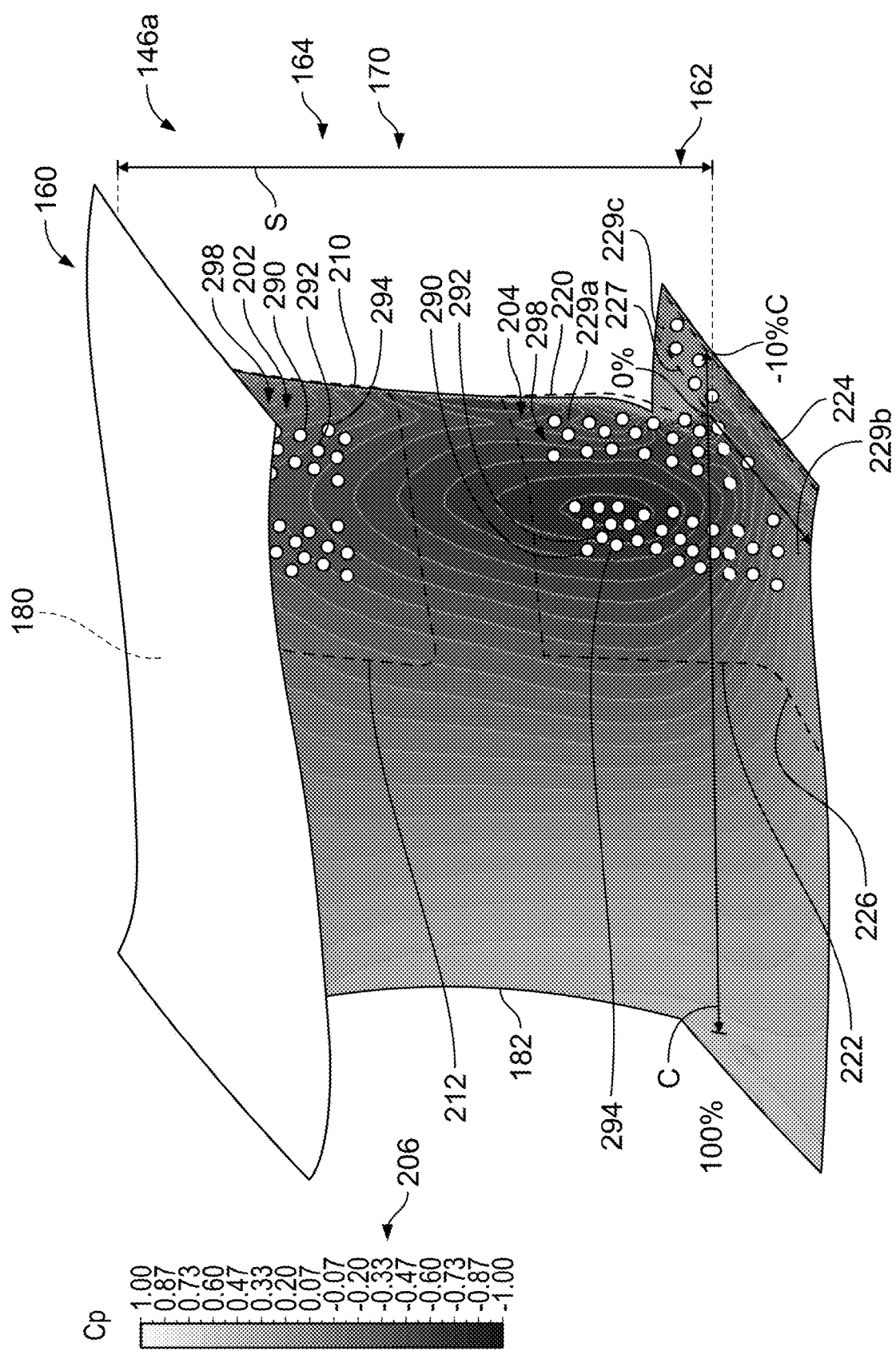
FIG. 4B is a detail schematic environmental view of a shroud, a hub, and a vane of the stator, which illustrates a coefficient of static pressure associated with the shroud, the hub, and the vane, and includes another exemplary first flow structure and second flow structure for the first local vortex generator array and the second local vortex generator array.
Figure 4C:
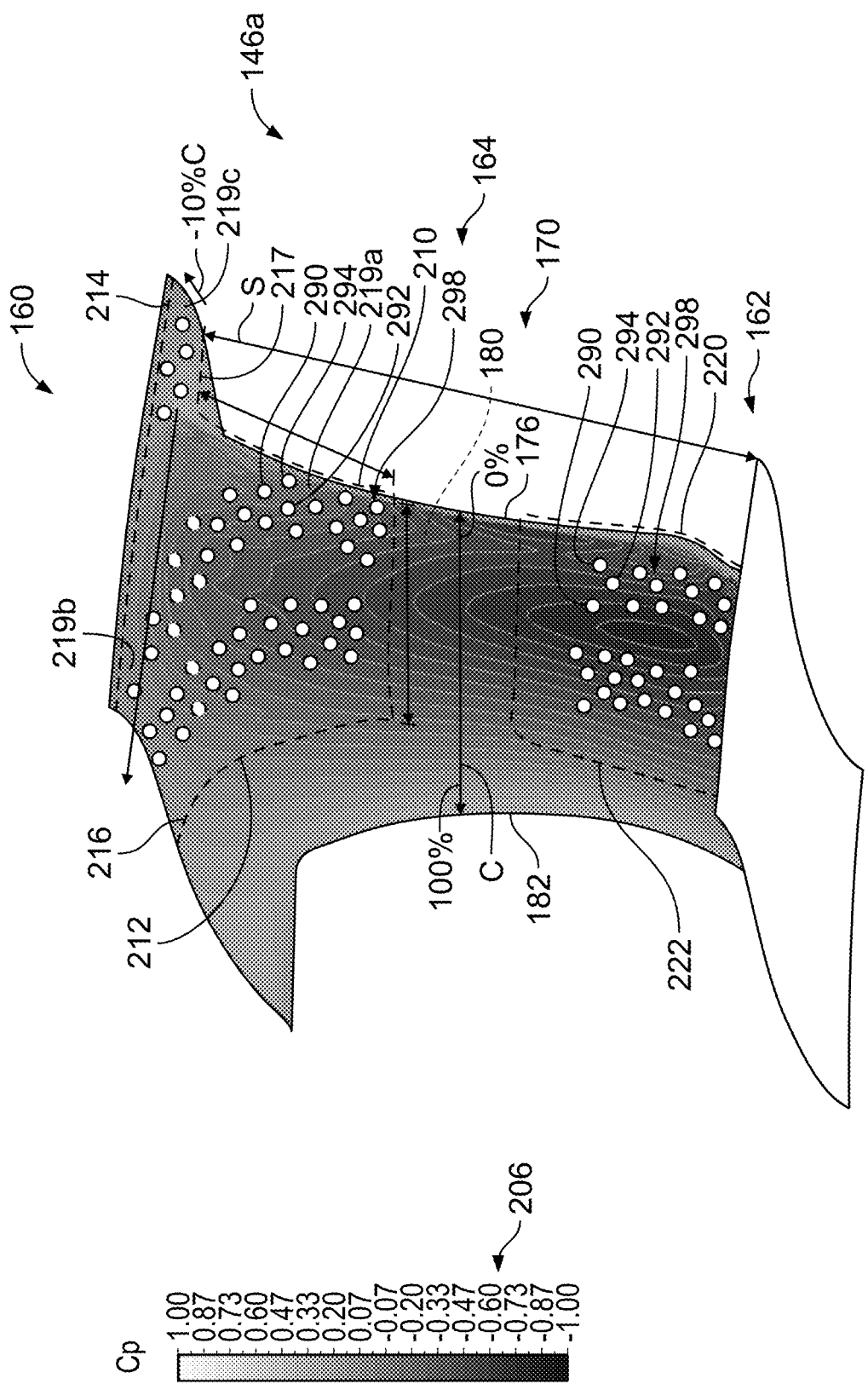
FIG. 4C is a detail schematic environmental view of a shroud, a hub, and the vane of the stator, which illustrates the coefficient of static pressure associated with the shroud, the hub and the vane and is rotated to illustrate the first local vortex generator array defined on the shroud.

With reference to FIGS. 4-4C, a static pressure distribution across one of the vanes 164, the shroud 160 and the hub 162 is shown, with the shading corresponding to the values of the coefficient of static pressure Cp provided in the legend 206. The coefficient of static pressure Cp is defined according to the following equation:

$$Cp=(Ps-P\sin)/(P\text{tin}-P\sin) \quad (1)$$

Wherein Cp is the coefficient of static pressure; Ps is the local static pressure as shown at the particular surface position on the vane 164, the shroud 160 or the hub 162; P sin is the circumferentially and radially area averaged static pressure at the leading edge 176 of the vane 164 of the stator 146a; and Ptin is the circumferentially and radially mass averaged total pressure of the leading edge 176 of the vane 164 of the stator 146a. The values for Ps, P sin and Ptin are each predetermined based on computational fluid dynamics analysis. In one example, the computational fluid dynamics analysis described herein may be performed using Star-CCM+ by Siemens PLM of Plano, Texas, United States of America or ANSYS CFX by Ansys Inc. of Canonsburg, Pennsylvania, United States of America, for example. The coefficient of static pressure distribution illustrates the static pressure variation of the air on the surface. With reference to FIG. 4, the airfoil 170 has a span S, which is 0% at the second fillet 186a, 186b at the interface between the hub 162 and the vane 164; and is 100% at the fillet 184a, 184b at the interface between the shroud 160 and the vane 164. Thus, the airfoil 170 extends in a spanwise direction from the fillet 186a, 186b at the hub 162 (0% span) to the fillet 184a, 184b at the shroud 160 (100% span). In addition, the airfoil 170 has a chord C defined as an imaginary straight line joining the leading edge 176 and trailing edge 178, and extends in a chordwise direction from the leading edge 176 at 0% chord to the trailing edge 178 at 100% chord. For each spanwise location or location along the span S, the airfoil 170 has a chord C that extends from the leading edge 176 to the trailing edge 178 at the spanwise location.

Generally, in this example, the first local vortex generator array 202 and the second local vortex generator array 204 are each defined on the suction side 182 of the airfoil 170 and extend from the suction side 182 to the respective one of the shroud 160 and the hub 162. In one example, the first local vortex generator array 202 is defined on the suction side 182 aft of the leading edge 176 and proximate an acceleration zone boundary 210 on the airfoil 170 for the air flowing through the stator 146a. The first local vortex generator array 202 is defined on the suction side 182 to extend downstream of the acceleration zone boundary 210 to a vortex generator zone boundary 212. The acceleration zone boundary 210 and the vortex generator zone boundary 212 are each predetermined based on computational fluid dynamics analysis. The acceleration zone boundary 210 is a line that denotes a forwardmost boundary line of an area where the coefficient of static pressure Cp is at a minimum and the air has the greatest velocity in the direction of fluid flow. The area where the coefficient of static pressure Cp is at a minimum and the air has the greatest velocity extends to the vortex generator zone boundary 212. The vortex generator zone boundary 212 is a line that denotes a forwardmost boundary line of an area in the direction of fluid flow where the coefficient of static pressure Cp is increasing and velocity of the air is decreasing, which indicates diffusion of the air.

As discussed, the first local vortex generator array 202 is defined on the suction side 182 downstream or aft of the leading edge 176. The first local vortex generator array 202 is defined between about 60% span to about 100% span and between about 1% chord to about 50% chord at the particular spanwise location. The first local vortex generator array 202 is defined on the shroud 160 to extend downstream of a shroud acceleration zone boundary 214 to a shroud vortex generator zone boundary 216 proximate the suction side 182. The first local vortex generator array 202 is also defined on the shroud 160 to extend downstream of the shroud acceleration zone boundary 214 to a second shroud vortex generator zone boundary 217 proximate the pressure side 180. The shroud acceleration zone boundary 214, the shroud vortex generator zone boundary 216 and the second shroud vortex generator zone boundary 217 are each predetermined based on computational fluid dynamics analysis. The shroud acceleration zone boundary 214 is a line that denotes a forwardmost boundary line of an area where the coefficient of static pressure Cp is at a minimum and the air has the greatest velocity in the direction of fluid flow. The area where the coefficient of static pressure Cp is at a minimum and the air has the greatest velocity extends to the shroud vortex generator zone boundary 216 or the second shroud vortex generator zone boundary 217. The shroud vortex generator zone boundary 216 and the second shroud vortex generator zone boundary 217 are each lines that denote a forwardmost boundary line of an area in the direction of fluid flow where the coefficient of static pressure Cp is increasing and velocity of the air is decreasing, which indicates diffusion of the air.

In one example, the first local vortex generator array 202 is defined on the shroud 160 proximate the suction side 182 to extend for up to about 60% of a distance D1 defined along the shroud 160 between adjacent vanes 164 (FIG. 3). The first local vortex generator array 202 is defined on the shroud 160 proximate the pressure side 180 to extend from the pressure side 180 for up to about 20% of the distance D1 defined between adjacent vanes 164 (FIG. 3). Stated another way, the first local vortex generator array 202 extends on the shroud 160 from the suction side 182 toward the pressure side 180 of an adjacent vane 164 by up to about 60% of the distance D1, and extends from the pressure side 180 toward the suction side 182 of an adjacent vane for up to about 20% of the distance D1. The first local vortex generator array 202 is also defined on the shroud 160 to extend between about negative 10% chord (or 10% forward of the leading edge 176 at 100% span) on the shroud 160 up to about 50% chord at 100% span. Thus, in this example, the first local vortex generator array 202 is defined in a first area 219a defined on the airfoil 170, a second area 219b (FIG. 4A) defined on the shroud 160 from the suction side 182 of the airfoil 170 and a third area 219c (FIG. 4A) defined on the shroud 160 from the pressure side 180 of the airfoil 170. The first area 219a extends from about 60% span to about 100% span and from about 1% chord to about 50% chord at the particular spanwise location. The second area 219b extends from about negative 10% chord to about 50% chord at 100% span, and from the suction side 182 to about 60% of the distance D1 to the pressure side 180 of the adjacent vane 164. The third area 219c extends from about negative 10% chord to about 0% chord at 100% span, and from the pressure side 180 to about 20% of the distance D1 to the suction side 182 of the adjacent vane 164.

In this example, the first local vortex generator array 202 is formed such that the fillet 184b at the interface between the suction side 182 and the shroud 160 may include the first local vortex generator array 202. Thus, the first local vortex generator array 202 is defined along the suction side 182 and extends along the fillet 184b, and is defined along the shroud 160 from the fillet 184b. It should be noted that in certain examples, depending on a stress analysis, for example, the first local vortex generator array 202 may be discontinuous and the fillet 184b may be devoid of the first local vortex generator array 202.

In one example, with reference back to FIG. 4, the second local vortex generator array 204 is defined on the suction side 182 aft of the leading edge 176 proximate or forward of a second acceleration zone boundary 220 on the airfoil 170 for the air flowing through the stator 146a. The second local vortex generator array 204 is defined on the suction side 182 to extend downstream of the second acceleration zone boundary 220 to a second vortex generator zone boundary 222. The second acceleration zone boundary 220 and the second vortex generator zone boundary 222 are each predetermined based on computational fluid dynamics analysis. The second acceleration zone boundary 220 denotes a forwardmost boundary line of an area where the coefficient of static pressure Cp is at a minimum and the air has the greatest velocity in the direction of fluid flow. The area where the coefficient of static pressure Cp is at a minimum and the air has the greatest velocity extends to the second vortex generator zone boundary 222. The second vortex generator zone boundary 222 denotes a forwardmost boundary line of an area where the coefficient of static pressure Cp is increasing and velocity of the air is decreasing in the direction of fluid flow, which indicates diffusion of the air. As discussed, the second local vortex generator array 204 is defined on the suction side 182 downstream or aft of the leading edge 176. The second local vortex generator array 204 is defined between about 0% span to about 40% span and between about 1% chord to about 50% chord at the particular spanwise location. The second local vortex generator array 204 is defined on the hub 162 to extend downstream of a hub acceleration zone boundary 224 to a hub vortex generator zone boundary 226 proximate the suction side 182. The second local vortex generator array 204 is also defined on the hub 162 to extend downstream of the hub acceleration zone boundary 224 to a second hub vortex generator zone boundary 227 proximate the pressure side 180. The hub acceleration zone boundary 224, the hub vortex generator zone boundary 226 and second hub vortex generator zone boundary 227 are each predetermined based on computational fluid dynamics analysis. The hub acceleration zone boundary 224 is a line that denotes a forwardmost boundary line of an area where the coefficient of static pressure Cp is at a minimum and the air has the greatest velocity in the direction of fluid flow. The area where the coefficient of static pressure Cp is at a minimum and the air has the greatest velocity extends to the hub vortex generator zone boundary 226 or second hub vortex generator zone boundary 227. The hub vortex generator zone boundary 226 and second hub vortex generator zone boundary 227 are each lines that denote a forwardmost boundary line of an area in the direction of fluid flow where the coefficient of static pressure Cp is increasing and velocity of the air is decreasing, which indicates diffusion of the air.

In one example, the second local vortex generator array 204 is defined on the hub 162 proximate the suction side 182 to extend on the hub 162 from the suction side 182 for up to about 60% of a second distance D2 defined along the hub 162 between adjacent vanes 164 (FIG. 3). The second local vortex generator array 204 is defined on the hub 162 proximate the pressure side 180 to extend from the pressure side 180 for up to about 20% of the second distance D2 defined between adjacent vanes 164 (FIG. 3). Stated another way, the second local vortex generator array 204 extends from the suction side 182 toward the pressure side 180 of an adjacent vane 164 by up to about 60% of the second distance D2, and extends from the pressure side 180 toward the suction side 182 of an adjacent vane for up to about 20% of the second distance D2. The second local vortex generator array 204 is also defined on the hub 162 to extend between about negative 10% chord (or 10% forward of the leading edge 176 at 0% span) on the hub 162 up to about 50% chord.

Thus, in this example, the second local vortex generator array 204 is defined in a fourth area 229a defined on the airfoil 170, a fifth area 229b defined on the hub 162 from the suction side 182 of the airfoil 170 and a sixth area 229c defined on the hub 162 from the pressure side 180 of the airfoil 170. The fourth area 229a extends from about 0% span to about 40% span and from about 1% chord to about 50% chord at the particular spanwise location. The fifth area 229b extends from about negative 10% chord to about 50% chord at 0% span, and from the suction side 182 to about 60% of the second distance D2 (FIG. 3) to the pressure side 180 of the adjacent vane 164. The sixth area 229c extends from about negative 10% chord to about 0% chord at 0% span, and from the pressure side 180 to about 20% of the distance D2 to the suction side 182 of the adjacent vane 164. Thus, the first local vortex generator array 202 and the second local vortex generator array 204 extend over a portion of the suction side 182 such that a portion of the suction side 182, for example, from about 40% span to 60% span, is devoid of the first local vortex generator array 202 and the second local vortex generator array 204.

In this example, the second local vortex generator array 204 is formed such that the second fillet 186b at the interface between the suction side 182 and the hub 162 includes the second local vortex generator array 204. Thus, the second local vortex generator array 204 is defined along the suction side 182 and extends along the second fillet 186b, and is defined along the hub 162 from the second fillet 186b. It should be noted that in certain examples, depending on a stress analysis, for example, the second local vortex generator array 204 may be discontinuous and the second fillet 186b may be devoid of the second local vortex generator array 204, if desired.

Figure 5:
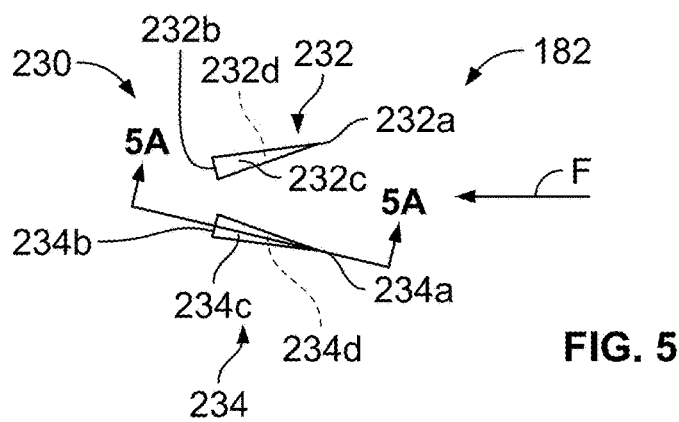
FIG. 5 is a top view of an exemplary first flow structure and second flow structure associated with the first local vortex generator array and the second local vortex generator array taken normal to a surface, which in this example is the surface of the suction side.

It should be noted that while the first local vortex generator array 202 and the second local vortex generator array 204 may be arranged so as to be discontinuous due to the respective fillet 184b, 186b, a pattern 230 associated with each of the first local vortex generator array 202 and the second local vortex generator array 204 may be continuous along the suction side 182 and the respective one of the shroud 160 and the hub 162. Stated another way, with reference to FIG. 5, which is a top down view looking perpendicular to the first local vortex generator array 202 and the second local vortex generator array 204, the first local vortex generator array 202 and the second local vortex generator array 204 each include a first flow structure 232 and a second flow structure 234 that are arranged in pairs on the suction side 182, the shroud 160 and the hub 162 to form the pattern 230, and the pattern 230 of the first flow structure 232 and the second flow structure 234 is continuous. The pattern 230 is a row and/or column of the pairs of the first flow structure 232 and the second flow structure 234, which extend in the chordwise, spanwise and tangential direction and define the first local vortex generator array 202 and the second local vortex generator array 204. An example of the first flow structure 232 and the second flow structure 234 are shown extending perpendicular to the suction side 182. As the first flow structure 232 and the second flow structure 234 that form the pattern 230 are defined the same on the shroud 160 and the hub 162, for ease of illustration, the first flow structure 232 and the second flow structure 234 defined on the suction side 182 will be shown herein, with the understanding that the first flow structure 232 and the second flow structure 234 defined on the shroud 160 and the hub 162 are the same. The first flow structure 232 and the second flow structure 234 may also be arranged as a mirror image along the suction side 182, the shroud 160 and the hub 162 to form the pattern 230.

The first flow structure 232 has a leading edge 232a and a trailing edge 232b; and the second flow structure 234 has a leading edge 234a and a trailing edge 234b. In this example, the leading edge 232a diverges from the leading edge 234a, while the trailing edge 232b converges toward the trailing edge 234b. In this example, the leading edge 232a, 234a of each of the first flow structure 232 and the second flow structure 234 have a thickness, which is different and less than a thickness of the trailing edge 232b, 234b. In one example, the trailing edges 232b, 234b terminate at a line. The first flow structure 232 and the second flow structure 234 each also include a respective tip 232c, 234c and a respective root 232d, 234d. The first flow structure 232 and the second flow structure 234 have a substantially triangular shape when viewed from the tip 232c, 234c. The tip 232c, 234c extends into the airflow, and the root 232d, 234d is coupled to or integrally formed with the suction side 182.

Figure 5A:
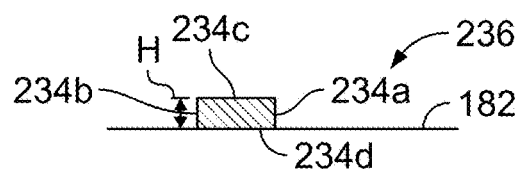
FIG. 5A is a cross-sectional view taken along line 5A-5A of FIG. 5, which illustrates an exemplary cross-section for the first flow structure and the second flow structure.

With reference to FIG. 5A, an exemplary cross-section 236 for each of the first flow structure 232 and the second flow structure 234 is shown. As the cross-section 236 may be the same for each of the first flow structure 232 and the second flow structure 234, for ease of description, the cross-section 236 for the second flow structure 234 will be shown and described herein, with the understanding that the cross-section 236 for the first flow structure 232 is the same. In this example, the cross-section 236 is substantially rectangular. It should be noted, however, that the first flow structure 232 and the second flow structure 234 may have any desired cross-section to control boundary layer growth and minimize secondary losses. For example, with reference to FIG. 5B, another exemplary cross-section 236' is shown. In this example, the cross-section 236' is triangular, with a base of the triangle defined at the leading edge 232a, 234a. It should be noted that although not shown herein, another exemplary cross-section may include triangular, in which a base of the triangle is defined at the trailing edge 232b, 234b. It should be noted, however, that the first flow structure 232 and the second flow structure 234 may have any desired cross-section to control boundary layer growth and minimize secondary losses. For example, with reference to FIG. 5C, another exemplary cross-section 236" is shown. In this example, the cross-section 236" is parallelogram in shape, with the leading edge 232a, 234a angled relative to the suction side 182 or angled toward the direction of flow along the suction side 182.

Figure 6:
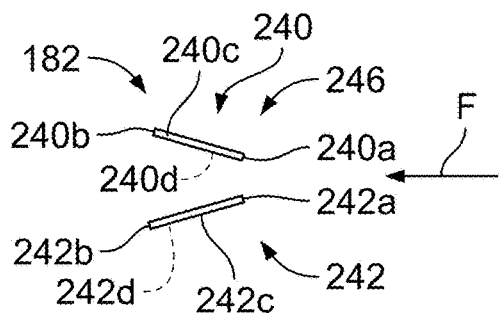
FIG. 6 is a top view of another exemplary first flow structure and second flow structure associated with the first local vortex generator array and the second local vortex generator array taken normal to a surface, which in this example is the surface of the suction side.

It should be noted that the first flow structure 232 and the second flow structure 234 may be configured differently to control boundary layer growth and minimize secondary losses. For example, with reference to FIG. 6, a first flow structure 240 and a second flow structure 242, which may be arranged in pairs on the suction side 182 to form a pattern 246 for the first local vortex generator array 202 and the second local vortex generator array 204, are shown extending perpendicular to the suction side 182. The pattern 246 is a row and/or column of the pairs of the first flow structure 240 and the second flow structure 242, as shown in FIGS. 4 and 4A for example, which defines the first local vortex generator array 202 and the second local vortex generator array 204. The first flow structure 240 and the second flow structure 242 that form the pattern 246 are defined the same on the shroud 160 and the hub 162, as shown in FIGS. 4 and 4A. As shown in FIGS. 4 and 4A, the first flow structure 240 and the second flow structure 242 may be arranged along the suction side 182, the shroud 160 and the hub 162 to form the pattern 246.

Figure 5B:
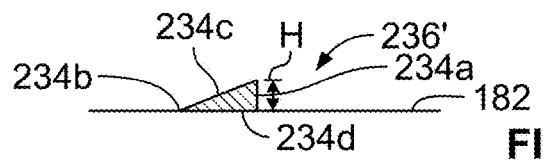
FIG. 5B is a cross-sectional view taken along line 5A-5A of FIG. 5, which illustrates another exemplary cross-section for the first flow structure and the second flow structure.

With reference back to FIG. 6, the first flow structure 240 has a leading edge 240a and a trailing edge 240b; and the second flow structure 242 has a leading edge 242a and a trailing edge 242b. In this example, the leading edge 240a converges toward the leading edge 242a, while the trailing edge 240b diverges from the trailing edge 242b. In this example, the leading edge 240a, 242a of each of the first flow structure 240 and the second flow structure 242 have a thickness, which is the same as a thickness of the trailing edge 240b, 242b. The first flow structure 240 and the second flow structure 242 each also include a respective tip 240c, 242c and a respective root 240d, 242d. The first flow structure 240 and the second flow structure 242 have a substantially rectangular shape when viewed from the tip 240c, 242c. The tip 240c, 242c extends into the airflow, and the root 240d, 242d is coupled to or integrally formed with the suction side 182. The first flow structure 240 and the second flow structure 242 have a cross-section, such as the cross-section 236 (FIG. 5A) or the cross-section 236' (FIG. 5B).

Figure 7:
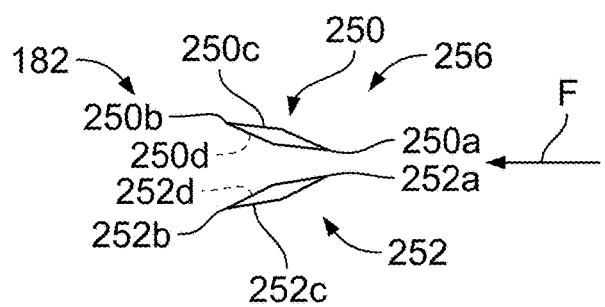
FIG. 7 is a top view of another exemplary first flow structure and second flow structure associated with the first local vortex generator array and the second local vortex generator array taken normal to a surface, which in this example is the surface of the suction side.

It should be noted that the first flow structure 232 and the second flow structure 234 may be configured differently to control boundary layer growth and minimize secondary losses. For example, with reference to FIG. 7, a first flow structure 250 and a second flow structure 252, which may be arranged in pairs on the suction side 182 to form a pattern 256 for the first local vortex generator array 202 and the second local vortex generator array 204, are shown extending perpendicular to the suction side 182. The pattern 256 is a row and/or column of the pairs of the first flow structure 250 and the second flow structure 252, which defines the first local vortex generator array 202 and the second local vortex generator array 204. As the first flow structure 250 and the second flow structure 252 that form the pattern 256 are defined the same on the shroud 160 and the hub 162, for ease of illustration, the first flow structure 250 and the second flow structure 252 defined on the suction side 182 will be shown herein, with the understanding that the first flow structure 250 and the second flow structure 252 defined on the shroud 160 and the hub 162 are the same. The first flow structure 250 and the second flow structure 252 may also be arranged as a mirror image along the suction side 182, the shroud 160 and the hub 162 to form the pattern 256.

Figure 5C:
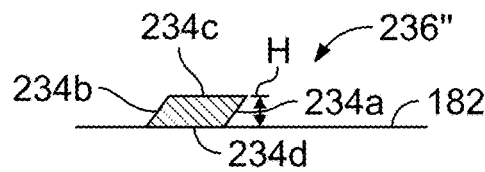
FIG. 5C is a cross-sectional view taken along line 5A-5A of FIG. 5, which illustrates another exemplary cross-section for the first flow structure and the second flow structure.

The first flow structure 250 has a leading edge 250a and a trailing edge 250b; and the second flow structure 252 has a leading edge 252a and a trailing edge 252b. In this example, the leading edge 250a converges toward the leading edge 252a, while the trailing edge 250b diverges from the trailing edge 252b. In this example, the leading edge 250a, 252a of each of the first flow structure 250 and the second flow structure 252 extend along a line, and the trailing edge 250b, 252b extends along a line. The first flow structure 250 and the second flow structure 252 each also include a respective tip 250c, 252c and a respective root 250d, 252d. The first flow structure 250 and the second flow structure 252 have a substantially parallelogram shape when viewed from the tip 250c, 252c. The tip 250c, 252c extends into the airflow, and the root 250d, 252d is coupled to or integrally formed with the suction side 182. The first flow structure 250 and the second flow structure 252 have a cross-section, such as the cross-section 236 (FIG. 5A), the cross-section 236' (FIG. 5B) or the cross-section 236" (FIG. 5C).

Figure 8:
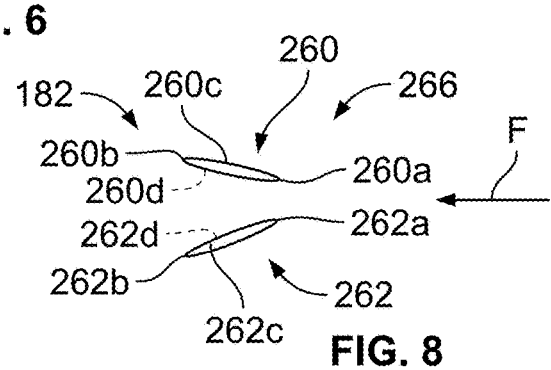
FIG. 8 is a top view of another exemplary first flow structure and second flow structure associated with the first local vortex generator array and the second local vortex generator array taken normal to a surface, which in this example is the surface of the suction side.

It should be noted that the first flow structure 232 and the second flow structure 234 may be configured differently to control boundary layer growth and minimize secondary losses. For example, with reference to FIG. 8, a first flow structure 260 and a second flow structure 262, which may be arranged in pairs on the suction side 182 to form a pattern 266 for the first local vortex generator array 202 and the second local vortex generator array 204, are shown extending perpendicular to the suction side 182. The pattern 266 is a row and/or column of the pairs of the first flow structure 260 and the second flow structure 262, which defines the first local vortex generator array 202 and the second local vortex generator array 204. As the first flow structure 260 and the second flow structure 262 that form the pattern 266 are defined the same on the shroud 160 and the hub 162, for ease of illustration, the first flow structure 260 and the second flow structure 262 defined on the suction side 182 will be shown herein, with the understanding that the first flow structure 260 and the second flow structure 262 defined on the shroud 160 and the hub 162 are the same. The first flow structure 260 and the second flow structure 262 may also be arranged along the suction side 182, the shroud 160 and the hub 162 to form the pattern 266.

The first flow structure 260 has a leading edge 260a and a trailing edge 260b; and the second flow structure 262 has a leading edge 262a and a trailing edge 262b. In this example, the leading edge 260a converges toward the leading edge 262a, while the trailing edge 260b diverges from the trailing edge 262b. In this example, the leading edge 260a, 262a of each of the first flow structure 260 and the second flow structure 262 extend along a line, and the trailing edge 260b, 262b extends along a line. The first flow structure 260 and the second flow structure 262 each also include a respective tip 260c, 262c and a respective root 260d, 262d. The first flow structure 260 and the second flow structure 262 have a substantially elliptical shape when viewed from the tip 260c, 262c. The tip 260c, 262c extends into the airflow, and the root 260d, 262d is coupled to or integrally formed with the suction side 182. The first flow structure 260 and the second flow structure 262 have a cross-section, such as the cross-section 236 (FIG. 5A), the cross-section 236' (FIG. 5B) or the cross-section 236" (FIG. 5C).

Figure 9:
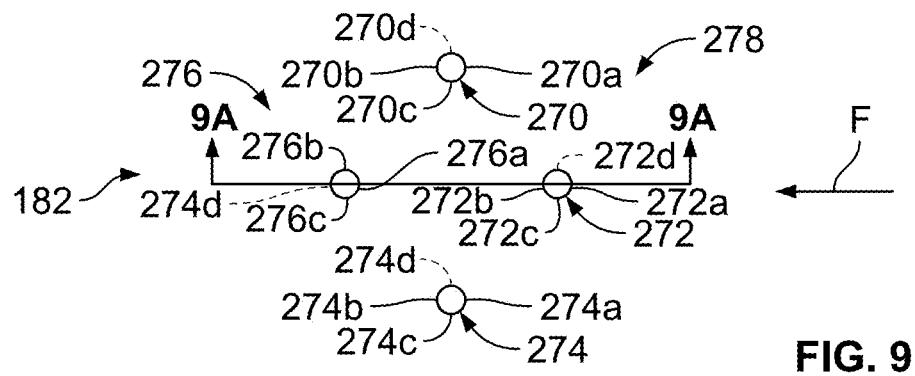
FIG. 9 is a top view of an exemplary first flow structure, second flow structure, third flow structure and fourth flow structure associated with the first local vortex generator array and the second local vortex generator array taken normal to a surface, which in this example is the surface of the suction side.

It should be noted that the first local vortex generator array 202 and the second local vortex generator array 204 may be configured differently to control boundary layer growth and minimize secondary losses. For example, with reference to FIG. 9, a first flow structure 270, a second flow structure 272, a third flow structure 274 and a fourth flow structure 276, which may be arranged in clusters on the suction side 182 to form a pattern 278 for the first local vortex generator array 202 and the second local vortex generator array 204, are shown extending perpendicular to the suction side 182. The pattern 278 is a row and/or column of the clusters of the first flow structure 270, the second flow structure 272, the third flow structure 274 and the fourth flow structure 276, which defines the first local vortex generator array 202 and the second local vortex generator array 204. As the first flow structure 270, the second flow structure 272, the third flow structure 274 and the fourth flow structure 276 that form the pattern 278 are defined the same on the shroud 160 and the hub 162, for ease of illustration, the first flow structure 270, the second flow structure 272, the third flow structure 274 and the fourth flow structure 276 defined on the suction side 182 will be shown herein, with the understanding that the first flow structure 270, the second flow structure 272, the third flow structure 274 and the fourth flow structure 276 defined on the shroud 160 and the hub 162 are the same.

Figure 9A:
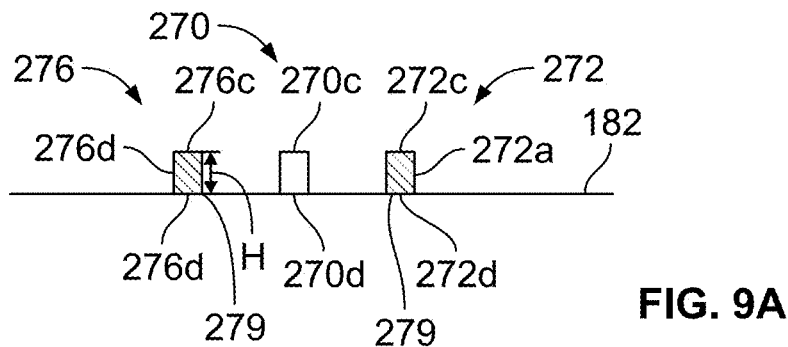
FIG. 9A is a cross-sectional view taken along line 9A-9A of FIG. 9, which illustrates an exemplary cross-section for the first flow structure, the second flow structure, the third flow structure and the fourth flow structure of FIG. 9.

In this example, each of the first flow structure 270, the second flow structure 272, the third flow structure 274 and the fourth flow structure 276 are cylindrical, and are spaced apart from each other along the suction side 182 so as to form an outline of a rhombus. In this example, each of the first flow structure 270, the second flow structure 272, the third flow structure 274 and the fourth flow structure 276 have the same diameter, however, the diameter of one or more of the first flow structure 270, the second flow structure 272, the third flow structure 274 and the fourth flow structure 276 may be different. The first flow structure 270, the second flow structure 272, the third flow structure 274 and the fourth flow structure 276 each have a leading edge 270a, 272a, 274a, 276a and an opposite trailing edge 270b, 272b, 274b, 276b. The first flow structure 270, the second flow structure 272, the third flow structure 274 and the fourth flow structure 276 each also include a respective tip 270c, 272c, 274c, 276c and a respective root 270d, 272d, 274d, 276d. The tip 270c, 272c, 274c, 276c extends into the airflow, and the root 270d, 272d, 274d, 276d is coupled to or integrally formed with the suction side 182. With reference to FIG. 9A, the first flow structure 270, the second flow structure 272, the third flow structure 274 and the fourth flow structure 276 have a cross-section 279. In this example, the cross-section 279 is circular.

Figure 10:
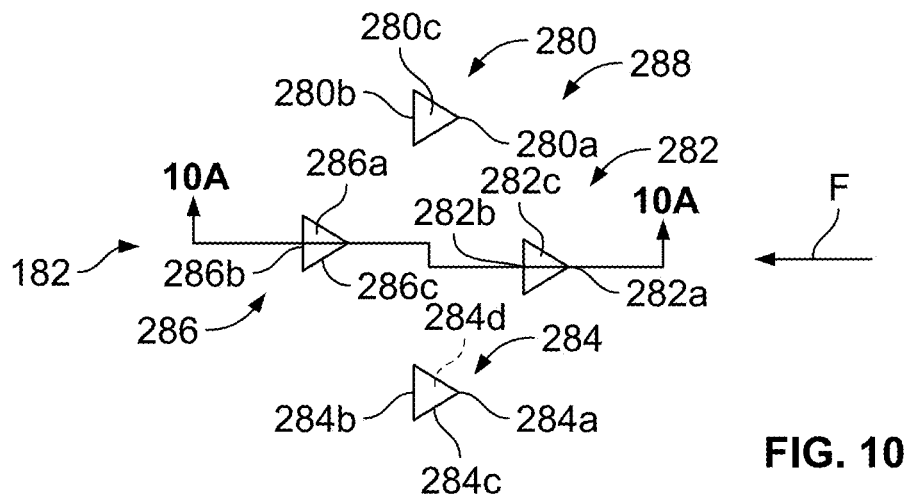
FIG. 10 is a top view of another exemplary first flow structure, second flow structure, third flow structure and fourth flow structure associated with the first local vortex generator array and the second local vortex generator array taken normal to a surface, which in this example is the surface of the suction side.

It should be noted that the first local vortex generator array 202 and the second local vortex generator array 204 may be configured differently to control boundary layer growth and minimize secondary losses. For example, with reference to FIG. 10, a first flow structure 280, a second flow structure 282, a third flow structure 284 and a fourth flow structure 286, which may be arranged in clusters on the suction side 182 to form a pattern 288 for the first local vortex generator array 202 and the second local vortex generator array 204, are shown extending perpendicular to the suction side 182. The pattern 288 is a row and/or column of the clusters of the first flow structure 280, the second flow structure 282, the third flow structure 284 and the fourth flow structure 286, which defines the first local vortex generator array 202 and the second local vortex generator array 204. As the first flow structure 280, the second flow structure 282, the third flow structure 284 and the fourth flow structure 286 that form the pattern 288 are defined the same on the shroud 160 and the hub 162, for ease of illustration, the first flow structure 280, the second flow structure 282, the third flow structure 284 and the fourth flow structure 286 defined on the suction side 182 will be shown herein, with the understanding that the first flow structure 280, the second flow structure 282, the third flow structure 284 and the fourth flow structure 286 defined on the shroud 160 and the hub 162 are the same.

Figure 10A:
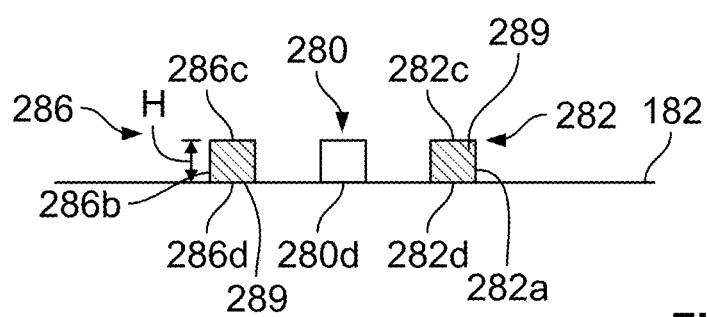
FIG. 10A is a cross-sectional view taken along line 10A-10A of FIG. 10, which illustrates an exemplary cross-section for the first flow structure, the second flow structure, the third flow structure and the fourth flow structure of FIG. 10.

In this example, each of the first flow structure 280, the second flow structure 282, the third flow structure 284 and the fourth flow structure 286 are triangular, and are spaced apart from each other along the suction side 182 so as to form a shape of a rhombus. In this example, each of the first flow structure 280, the second flow structure 282, the third flow structure 284 and the fourth flow structure 286 have the same size, however, the size of one or more of the first flow structure 280, the second flow structure 282, the third flow structure 284 and the fourth flow structure 286 may be different sizes. The first flow structure 280, the second flow structure 282, the third flow structure 284 and the fourth flow structure 286 each have a leading edge 280a, 282a, 284a, 286a and an opposite trailing edge 280b, 282b, 284b, 286b. The first flow structure 280, the second flow structure 282, the third flow structure 284 and the fourth flow structure 286 each also include a respective tip 280c, 282c, 284c, 286c and a respective root 280d, 282d, 284d, 286d. The tip 280c, 282c, 284c, 286c extends into the airflow, and the root 280d, 282d, 284d, 286d is coupled to or integrally formed with the suction side 182. With reference to FIG. 10A, the first flow structure 280, the second flow structure 282, the third flow structure 284 and the fourth flow structure 286 have a cross-section 289. In this example, the cross-section 289 is triangular.

Figure 11:
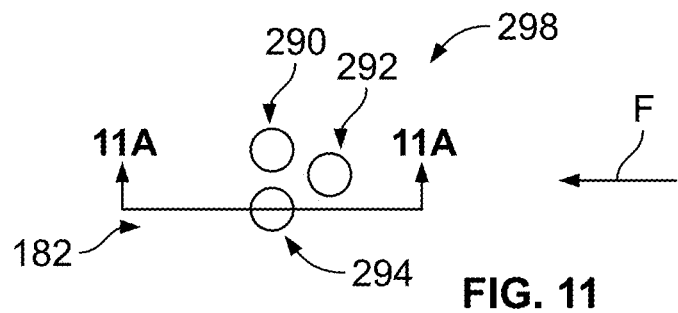
FIG. 11 is a top view of an exemplary first flow structure, second flow structure, and third flow structure associated with the first local vortex generator array and the second local vortex generator array taken normal to a surface, which in this example is the surface of the suction side.

It should be noted that the first local vortex generator array 202 and the second local vortex generator array 204 may be configured differently to control boundary layer growth and minimize secondary losses. For example, with reference to FIG. 11, a first flow structure 290, a second flow structure 292 and a third flow structure 294, which may be defined in clusters on the suction side 182 to form a pattern 298 for the first local vortex generator array 202 and the second local vortex generator array 204, are shown recessed within the suction side 182. The pattern 298 is a row and/or column of the clusters of the first flow structure 290, the second flow structure 292 and the third flow structure 294, which defines the first local vortex generator array 202 and the second local vortex generator array 204. The first flow structure 290, the second flow structure 292 and the third flow structure 294 that form the pattern 298 are defined the same on the shroud 160 and the hub 162, as shown in FIGS. 4B and 4C.

Figure 11A:
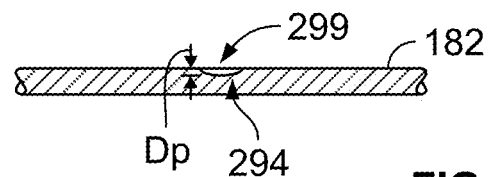
FIG. 11A is a cross-sectional view taken along line 11A-11A of FIG. 11, which illustrates an exemplary cross-section for the first flow structure, the second flow structure, and the third flow structure of FIG. 11.

In this example, each of the first flow structure 290, the second flow structure 292 and the third flow structure 294 are circular, and are defined within the suction side 182, the shroud 160 and the hub 162 so as to be spaced apart from each other along the suction side 182 in a shape of a triangle. In this example, each of the first flow structure 290, the second flow structure 292 and the third flow structure 294 have the same size, however, the size of one or more of the first flow structure 290, the second flow structure 292 and the third flow structure 294 may be different sizes. With reference to FIG. 11A, the first flow structure 290, the second flow structure 292 and the third flow structure 294 have a cross-section 299. In this example, the cross-section 299 is concave.

Figure 12:
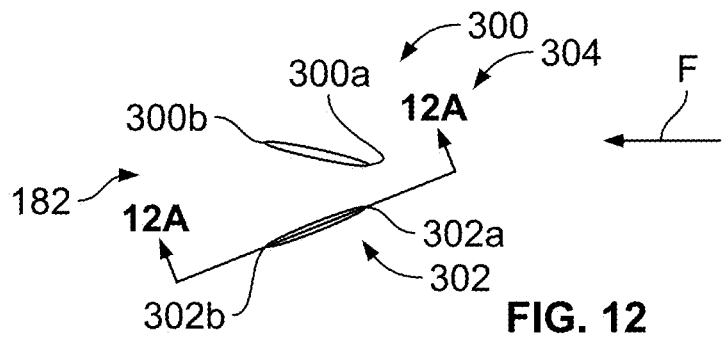
FIG. 12 is a top view of another exemplary first flow structure and second flow structure associated with the first local vortex generator array and the second local vortex generator array taken normal to a surface, which in this example is the surface of the suction side.

It should be noted that the first local vortex generator array 202 and the second local vortex generator array 204 may be configured differently to control boundary layer growth and minimize secondary losses. For example, with reference to FIG. 12, a first flow structure 300 and a second flow structure 302, which may be defined in pairs on the suction side 182 to form a pattern 304 for the first local vortex generator array 202 and the second local vortex generator array 204, are shown recessed within the suction side 182. The pattern 304 is a row and/or column of the pairs of the first flow structure 300 and the second flow structure 302, which defines the first local vortex generator array 202 and the second local vortex generator array 204. As the first flow structure 300 and the second flow structure 302 that form the pattern 304 are defined the same on the shroud 160 and the hub 162, for ease of illustration, the first flow structure 300 and the second flow structure 302 defined on the suction side 182 will be shown herein, with the understanding that the first flow structure 300 and the second flow structure 302 defined on the shroud 160 and the hub 162 are the same.

Figure 12A:
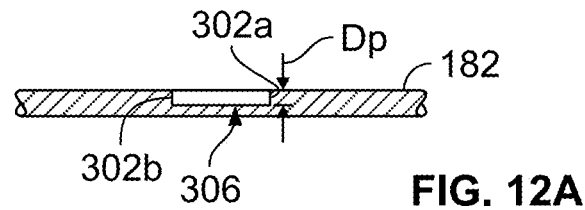
FIG. 12A is a cross-sectional view taken along line 12A-12A of FIG. 12, which illustrates an exemplary cross-section for the first flow structure and the second flow structure of FIG. 12.

In this example, each of the first flow structure 300 and the second flow structure 302 are elliptical, and are defined within the suction side 182 such that first ends 300a, 302a of the first flow structure 300 and the second flow structure 302 converge toward each other, and second ends 300b, 302b diverge away from each other. In this example, each of the first flow structure 300 and the second flow structure 302 have the same size, however, the size of one or more of the first flow structure 300 and the second flow structure 302 may be different sizes. With reference to FIG. 12A, the first flow structure 300 and the second flow structure 302 have a cross-section 306. In this example, the cross-section 306 is rectangular.

Figure 13:
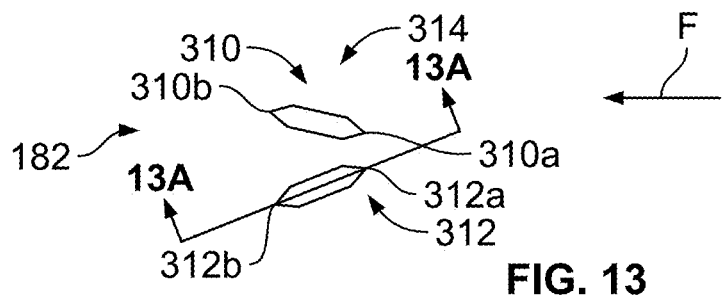
FIG. 13 is a top view of another exemplary first flow structure and second flow structure associated with the first local vortex generator array and the second local vortex generator array taken normal to a surface, which in this example is the surface of the suction side.

It should be noted that the first local vortex generator array 202 and the second local vortex generator array 204 may be configured differently to control boundary layer growth and minimize secondary losses. For example, with reference to FIG. 13, a first flow structure 310 and a second flow structure 312, which may be defined in pairs on the suction side 182 to form a pattern 314 for the first local vortex generator array 202 and the second local vortex generator array 204, are shown recessed within the suction side 182. The pattern 314 is a row and/or column of the pairs of the first flow structure 310 and the second flow structure 312, which defines the first local vortex generator array 202 and the second local vortex generator array 204. As the first flow structure 310 and the second flow structure 312 that form the pattern 314 are defined the same on the shroud 160 and the hub 162, for ease of illustration, the first flow structure 310 and the second flow structure 312 defined on the suction side 182 will be shown herein, with the understanding that the first flow structure 310 and the second flow structure 312 defined on the shroud 160 and the hub 162 are the same.

Figure 13A:
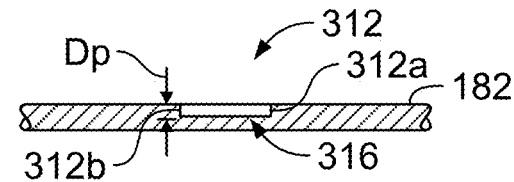
FIG. 13A is a cross-sectional view taken along line 13A-13A of FIG. 13, which illustrates an exemplary cross-section for the first flow structure and the second flow structure of FIG. 13.

In this example, each of the first flow structure 310 and the second flow structure 312 are polygonal, and are defined within the suction side 182 such that triangular first ends 310a, 312a of the first flow structure 310 and the second flow structure 312 converge toward each other, and triangular second ends 310b, 312b diverge away from each other. In this example, each of the first flow structure 310 and the second flow structure 312 have the same size, however, the size of one or more of the first flow structure 310 and the second flow structure 312 may be different sizes. With reference to FIG. 13A, the first flow structure 310 and the second flow structure 312 have a cross-section 316. In this example, the cross-section 316 is rectangular.

Thus, the first local vortex generator array 202 and the second local vortex generator array 204 are defined on the suction side 182, the shroud 160 and the hub 162 in a respective one of the patterns 230, 246, 256, 266, 278, 288, 298, 304, 314. Generally, the pattern 230, 246, 256, 266, 278, 288, 298, 304, 314 is the same along the suction side 182, the shroud 160 and the hub 162, however, the pattern 230, 246, 256, 266, 278, 288, 298, 304, 314 may be different between one or more of the suction side 182, the shroud 160 and the hub 162. Stated another way, one or more of the areas 219a, 219b, 219c, 229a, 229b, 229c may have a different pattern 230, 246, 256, 266, 278, 288, 298, 304, 314 of the flow structures 232, 234, 240, 242, 250, 252, 260, 262, 270, 272, 274, 276, 280, 282, 284, 286, 290, 292, 294, 300, 302, 310, 312. In other words, the arrangement of the flow structures 232, 234, 240, 242, 250, 252, 260, 262, 270, 272, 274, 276, 280, 282, 284, 286, 290, 292, 294, 300, 302, 310, 312 may be arbitrary or non-uniform, and the flow structures 232, 234, 240, 242, 250, 252, 260, 262, 270, 272, 274, 276, 280, 282, 284, 286, 290, 292, 294, 300, 302, 310, 312 may cover a portion of the areas 219a, 219b, 219c, 229a, 229b, 229c.

Generally, the leading edge 232a, 234a, 250a, 252a, 260a, 262a, 270a, 272a, 274a, 276a, 280a, 282a, 284a, 286a, 290a, 292a, 294a, 300a, 302a, 310a, 312a of each of the flow structures 232, 234, 240, 242, 250, 252, 260, 262, 270, 272, 274, 276, 280, 282, 284, 286, 290, 292, 294, 300, 302, 310, 312 faces into the incoming airflow as shown in FIG. 4D. FIG. 4D is a schematic view of the flow structures 240, 242 arranged in the pattern 246 along one of the areas 219a, 219b, 219c, 229a, 229b, 229c. In this example, the pattern 246 of the flow structures 240, 242 is in a repeating pattern such that the columns of pairs of the flow structures 240, 242 repeat along the surface of the respective one of the suction side 182, the shroud 160 or the hub 162 of the respective one of the areas 219a, 219b, 219c, 229a, 229b, 229c. As shown, the alternating columns are offset by about ⅓ pitch or about 30% to modify the generation of turbulence in the boundary layer. In this case the pitch is measured from the trailing edge 240b to the trailing edge 242b. It should be noted that the pattern 246 of the flow structures 240, 242 may be arranged differently to control boundary layer growth and minimize secondary losses. For example, with reference to FIG. 4E, a schematic view of the flow structures 240, 242 arranged in the pattern 246 along one of the areas 219a, 219b, 219c, 229a, 229b, 229c is shown. In this example, the pattern 246 of the flow structures 240, 242 is in an alternating pattern such that the columns of pairs of the flow structures 240, 242 alternate between converging in the direction of flow F and diverging in the direction of flow F along the surface of the respective one of the suction side 182, the shroud 160 or the hub 162 of the respective one of the areas 219a, 219b, 219c, 229a, 229b, 229c. As shown, the alternating columns are offset by about ⅓ pitch or about 30% to modify the generation of turbulence in the boundary layer. In this case the pitch is measured from the trailing edge 240b to the trailing edge 242b. Thus, generally, adjacent columns of the flow structures 232, 234, 240, 242, 250, 252, 260, 262, 270, 272, 274, 276, 280, 282, 284, 286, 290, 292, 294, 300, 302, 310, 312 may be misaligned or offset from each other to increase turbulence in boundary layer. The pitch variation is predetermined to control the generation of turbulence in the boundary layer. The diverging-converging pattern 246 promotes mixing of the flow and generates turbulence. In the example of FIG. 4E, the leading edge 240a, 242a of the flow structures 240, 242 arranged in one column of the pattern 246 faces into the incoming airflow, while the trailing edge 240b, 242b of the adjacent column of the pattern 246 faces into the incoming airflow. Thus, generally, while the flow structures 232, 234, 240, 242, 250, 252, 260, 262, 270, 272, 274, 276, 280, 282, 284, 286, 290, 292, 294, 300, 302, 310, 312 are defined herein using the terms "leading end" and "trailing end" the orientation of the flow structures 232, 234, 240, 242, 250, 252, 260, 262, 270, 272, 274, 276, 280, 282, 284, 286, 290, 292, 294, 300, 302, 310, 312 may be such that the "trailing end" is faces into the incoming flow to promote turbulence.

The flow structures 232, 234, 240, 242, 250, 252, 260, 262 are arranged in pairs to form the respective pattern 230, 246, 256, 266 along the suction side 182, the shroud 160 and the hub 162. Generally, each of the pairs of the flow structures 232, 234, 240, 242, 250, 252, 260, 262 are substantially evenly spaced along the suction side 182, the shroud 160 and the hub 162 to form the pattern 230, 246, 256, 266. The flow structures 270, 272, 274, 276, 280, 282, 284, 286 are arranged in clusters along the suction side 182, the shroud 160 and the hub 162 to form the respective pattern 278, 288. Generally, each of the clusters of the flow structures 270, 272, 274, 276, 280, 282, 284, 286 are substantially evenly spaced along the suction side 182, the shroud 160 and the hub 162 to form the pattern 278, 288. The flow structures 290, 292, 294 are arranged in clusters along the suction side 182, the shroud 160 and the hub 162 to form the pattern 298. Each of the clusters of the flow structures 290, 292, 294 are substantially evenly spaced along the suction side 182, the shroud 160 and the hub 162 to form the pattern 298. The flow structures 300, 302, 310, 312 are arranged in pairs along the suction side 182, the shroud 160 and the hub 162 to form the respective pattern 304, 314. Generally, each of the pairs of the flow structures 300, 302, 310, 312 are substantially evenly spaced along the suction side 182, the shroud 160 and the hub 162 to form the pattern 304, 314.

The pattern 230, 246, 256, 266, 278, 288, 298, 304, 314 of the respective flow structures 232, 234, 240, 242, 250, 252, 260, 262, 270, 272, 274, 276, 280, 282, 284, 286, 290, 292, 294, 300, 302, 310, 312 extends in the chordwise, spanwise and tangential direction within all or a portion of the respective area 219a, 219b, 219c, 229a, 229b, 229c. It should be noted that while the flow structures 232, 234, 240, 242, 250, 252, 260, 262, 270, 272, 274, 276, 280, 282, 284, 286, 290, 292, 294, 300, 302, 310, 312 are shown arranged in the respective pairs or clusters, in other embodiments, the flow structures 232, 234, 240, 242, 250, 252, 260, 262, 270, 272, 274, 276, 280, 282, 284, 286, 290, 292, 294, 300, 302, 310, 312 may be defined individually or separately in any predetermined arrangement on the suction side 182, the shroud 160 and/or the hub 162. Moreover, the suction side 182, the shroud 160 and/or the hub 162 may include any combination of the flow structures 232, 234, 240, 242, 250, 252, 260, 262, 270, 272, 274, 276, 280, 282, 284, 286, 290, 292, 294, 300, 302, 310, 312 and thus, the arrangement of the flow structures 232, 234, 240, 242, 250, 252, 260, 262, 270, 272, 274, 276, 280, 282, 284, 286, 290, 292, 294, 300, 302, 310, 312 into pairs and clusters described and illustrated herein is merely an example. Further, while the flow structures 232, 234, 240, 242, 250, 252, 260, 262, 270, 272, 274, 276, 280, 282, 284, 286, 290, 292, 294, 300, 302, 310, 312 are illustrated and described herein as being arranged in particular orientation, the flow structures 232, 234, 240, 242, 250, 252, 260, 262, 270, 272, 274, 276, 280, 282, 284, 286, 290, 292, 294, 300, 302, 310, 312 may be arranged in any predetermined orientation to control boundary layer growth and minimize secondary losses. Thus, generally, the first local vortex generator array 202 may comprise any combination of the flow structures 232, 234, 240, 242, 250, 252, 260, 262, 270, 272, 274, 276, 280, 282, 284, 286, 290, 292, 294, 300, 302, 310, 312 arranged in any predetermined orientation and arrangement to control boundary layer growth and minimize secondary losses. Similarly, the second local vortex generator array 204 may comprise any combination of the flow structures 232, 234, 240, 242, 250, 252, 260, 262, 270, 272, 274, 276, 280, 282, 284, 286, 290, 292, 294, 300, 302, 310, 312 arranged in any predetermined orientation and arrangement to control boundary layer growth and minimize secondary losses. Moreover, while FIGS. 4-4A illustrate the first local vortex generator array 202 and the second local vortex generator array 204 defined over the entirety of the area 219a, 219b, 219c, 229a, 229b, 229c, the first local vortex generator array 202 and the second local vortex generator array 204 may extend over a portion of the area 219a, 219b, 219c, 229a, 229b, 229c as shown in FIGS. 4B-4C to control boundary layer growth and minimize secondary losses.

In one example, the flow structures 232, 234, 240, 242, 250, 252, 260, 262, 270, 272, 274, 276, 280, 282, 284, 286 are defined on the suction side 182, the shroud 160 and the hub 162 to have a height H (FIGS. 5A, 5B, 5C, 9A, 10A) above a surface the suction side 182, the shroud 160 and the hub 162. In one example, the height H is about 0.25% to about 3% of a length of the chord of the airfoil 170, and in this example, is about 0.005 inches (in.) to about 0.030 inches (in.) for the airfoil 170 having the chord of about 1.0 inches (in.) to about 2.0 inches (in.). The flow structures 232, 234, 240, 242, 250, 252, 260, 262, 270, 272, 274, 276, 280, 282, 284, 286 may also have a width or thickness of about 0.005 inches (in.) to about 0.010 inches (in.) or may have a width of about 0.005 inches (in.) to about 0.010 inches (in.) in the spanwise direction. The flow structures 232, 234, 240, 242, 250, 252, 260, 262, 270, 272, 274, 276, 280, 282, 284, 286 and may be about 0.030 inches (in.) long or may extend for about 0.030 inches (in.) in the chordwise direction. The flow structures 290, 292, 294, 300, 302, 310, 312 are defined on the suction side 182, the shroud 160 and the hub 162 to have a depth Dp (FIGS. 11A and 12A) below the surface of the suction side 182, the shroud 160 and the hub 162 that is about 0.005 inches (in.) to about 0.030 inches (in.) for the airfoil 170 having the chord of about 1.0 inches (in.) to about 2.0 inches (in.). The flow structures 290, 292, 294, 300, 302, 310, 312 may have a diameter of about 0.030 inches (in.). It should be noted that the height H and the depth Dp would be scaled accordingly for airfoils 170 with different chord lengths. Generally, the height H and the depth Dp are predetermined based on the boundary layer thickness and shape, which are determined by computational fluid dynamics analysis.

Figure 14:
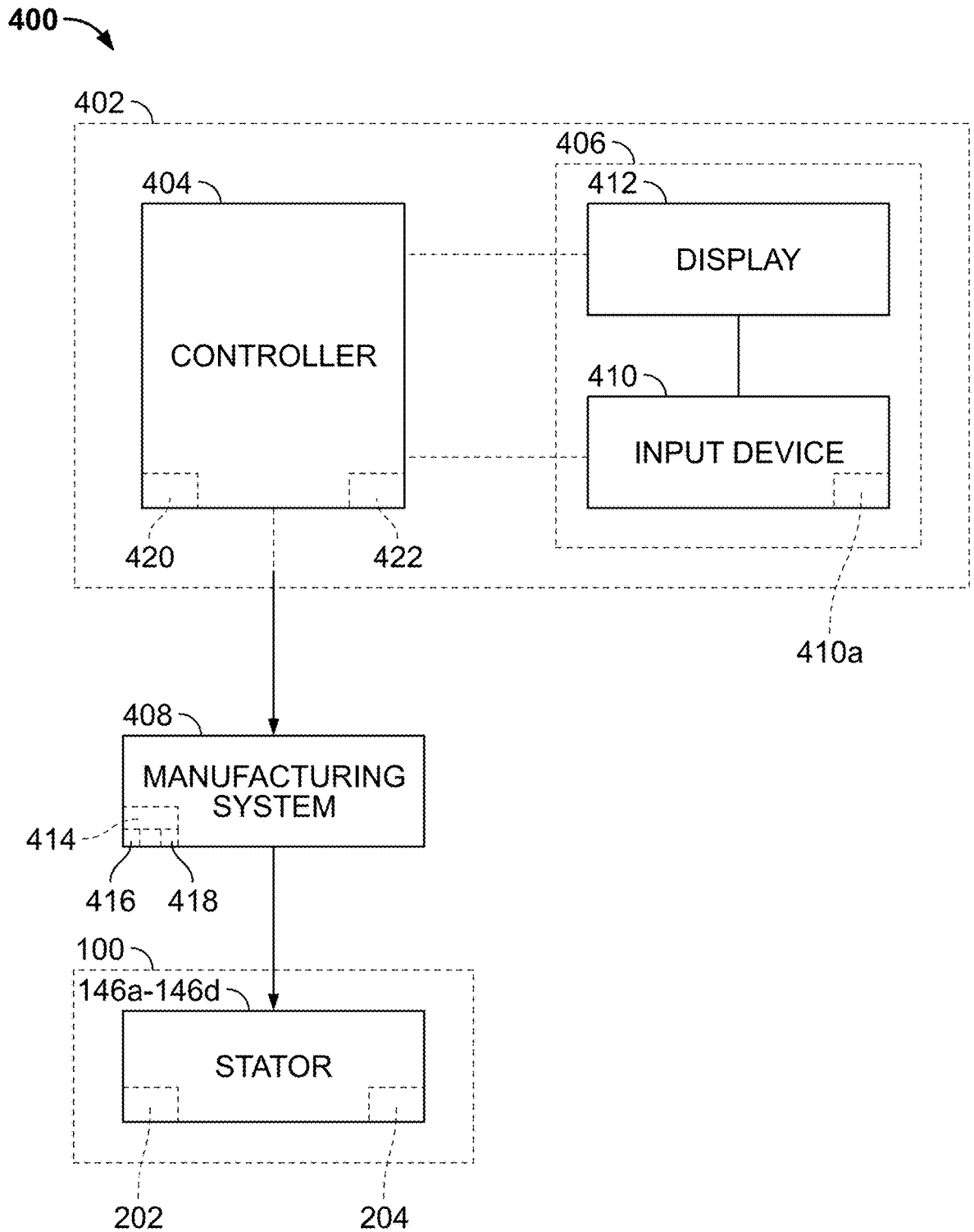
FIG. 14 is a functional block diagram of a system for manufacturing the stator, which includes the first local vortex generator array and the second vortex generator array.

In one example, with reference to FIG. 14, FIG. 14 is a functional block diagram of a system 400 for manufacturing the first local vortex generator array 202 and the second local vortex generator array 204 on one or more of the stators 146a-146d associated with the gas turbine engine 100 is illustrated. The system 400 includes a controller 404, a human-machine interface 406 and a manufacturing system 408.

The human-machine interface 406 is in communication with the controller 404 via a suitable communication medium, such as a bus. The human-machine interface 406 may be configured in a variety of ways. In some embodiments, the human-machine interface 406 may include at least one input device 410 and a display 412. The at least one input device 410, includes, but is not limited to, switches, one or more buttons, a touchscreen interface 410a that may be overlaid on a display 412, a keyboard, an audible device, a microphone associated with a speech recognition system, or various other human-machine interface devices. In one example, the input device 410 may receive input from the user, such as design criteria data for the design of the respective stator 146a-146d, empirical data regarding a predetermined design for the respective stator 146a-146d, data regarding the shape for the first local vortex generator array 202 and the second local vortex generator array 204, build data regarding how the respective stator 146a-146d is to be manufactured and parameter data regarding the manufacturing efficiency associated with the respective stator 146a-146d. The touchscreen interface 410a may include, but is not limited to, a resistive touchscreen panel, a capacitive touchscreen panel, a projected capacitance touchscreen panel, a surface capacitive touchscreen panel, a surface acoustic wave touchscreen panel, etc. Generally, upon the receipt of input from the user, the human-machine interface 406 transmits a signal to the controller 404. As will be discussed, the controller 404 processes the signal, and determines based on the input from the user and based on input received from other modules associated with the controller 404, whether to release the design for the respective stator 146a-146d.

The display 412 comprises any suitable technology for displaying information, including, but not limited to, a liquid crystal display (LCD), organic light emitting diode (OLED), plasma, or a cathode ray tube (CRT). In this example, the display 412 is an electronic display capable of graphically displaying one or more user interfaces under the control of the controller 404. Those skilled in the art may realize other techniques to implement the display 412 in the system 400.

It should be noted that the human-machine interface 406 and the controller 404 may be associated with a personal computing device 402, including, but not limited to a desktop computer, laptop computer, tablet, portable electronic device, etc. Moreover, it should be noted that while the controller 404 and the human-machine interface 406 are described and illustrated herein as being discrete from the manufacturing system 408, the manufacturing system 408 may include the controller 404 such that in certain embodiments, the system 400 may include the manufacturing system 408 having the controller 404 and a manufacturing controller 414 associated with the manufacturing system 408.

The manufacturing system 408 is any system or device that is capable of creating the stators 146a-146d of the gas turbine engine 100. In one example, the manufacturing system 408 machines the stators 146a-146d based on one or more instructions received from the controller 404. The manufacturing system 408 includes any system capable of additive manufacturing each of the stators 146a-146d to include the first local vortex generator array 202 and the second local vortex generator array 204. In one example, the manufacturing system 408 includes, but is not limited to, a three dimensional metal printing machine, a direct metal laser sintering machine, or other manufacturing machines to list but a few examples. In other examples, the manufacturing system 408 includes, but is not limited to, a computer numeric control (CNC) machine, an electro-chemical machining machine, a powder metallurgy machine, a composite ply lay-up machine or other manufacturing machines to list but a few examples.

In one example, the manufacturing system 408 generally forms or builds each of the airfoils 170, the shroud 160 and the hub 162 via additive manufacturing out of a metal or metal alloy. In this example, the manufacturing system 408 includes the manufacturing controller 414, which is in communication with the controller 404 via a suitable communication architecture, such as a bus. The manufacturing controller 414 includes at least one manufacturing processor 416 and a manufacturing computer readable storage device or media 418. The manufacturing processor 416 can be any custom made or commercially available processor, a central processing unit (CPU), a graphics processing unit (GPU), an auxiliary processor among several processors associated with the manufacturing controller 414, a semiconductor based microprocessor (in the form of a microchip or chip set), a macroprocessor, any combination thereof, or generally any device for executing instructions. The manufacturing computer readable storage device or media 418 may include volatile and nonvolatile storage in read-only memory (ROM), random-access memory (RAM), and keep-alive memory (KAM), for example. KAM is a persistent or non-volatile memory that may be used to store various operating variables while the manufacturing processor 416 is powered down. The computer-readable storage device or media 418 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the manufacturing controller 414 in controlling components associated with the manufacturing system 408 to build the stator 146a-146d.

The instructions may include one or more separate programs, each of which comprises an ordered listing of executable instructions for implementing logical functions. The instructions, when executed by the manufacturing processor 416, receive and process input signals, perform logic, calculations, methods and/or algorithms for controlling the components of the manufacturing system 408, and generate control signals to the components of the manufacturing system 408, including, but not limited to, a laser associated with the manufacturing system 408 to additively build the stator 146a-146d based on the logic, calculations, methods, and/or algorithms. Although only one manufacturing controller 414 is shown in FIG. 14, embodiments of the manufacturing system 408 can include any number of manufacturing controllers 414 that communicate over any suitable communication medium or a combination of communication mediums and that cooperate to process signals, perform logic, calculations, methods, and/or algorithms, and generate control signals to control features, such as a laser, of the manufacturing system 408 to form the stator 146a-146d. Generally, the manufacturing controller 414 executes the instructions to manufacture the stator 146a-146d based on data received from the controller 404.

The controller 404 includes at least one processor 420 and a computer readable storage device or media 422. The processor 420 can be any custom made or commercially available processor, a central processing unit (CPU), a graphics processing unit (GPU), an auxiliary processor among several processors associated with the controller 404, a semiconductor based microprocessor (in the form of a microchip or chip set), a macroprocessor, any combination thereof, or generally any device for executing instructions. The computer readable storage device or media 422 may include volatile and nonvolatile storage in read-only memory (ROM), random-access memory (RAM), and keep-alive memory (KAM), for example. KAM is a persistent or non-volatile memory that may be used to store various operating variables while the processor 420 is powered down. The computer-readable storage device or media 422 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 404 in controlling components associated with the system 400.

The instructions may include one or more separate programs, each of which comprises an ordered listing of executable instructions for implementing logical functions. The instructions, when executed by the processor 420, receive and process input signals, perform logic, calculations, methods and/or algorithms for controlling the components of the system 400, and generate control signals to components of the system 400 to manufacture the stators 146a-146d based on the logic, calculations, methods, and/or algorithms. Although only one controller 404 is shown in FIG. 14, embodiments of the system 400 can include any number of controllers 404 that communicate over any suitable communication medium or a combination of communication mediums and that cooperate to process signals, perform logic, calculations, methods, and/or algorithms, and generate control signals to control features of the system 400.

Figure 15:
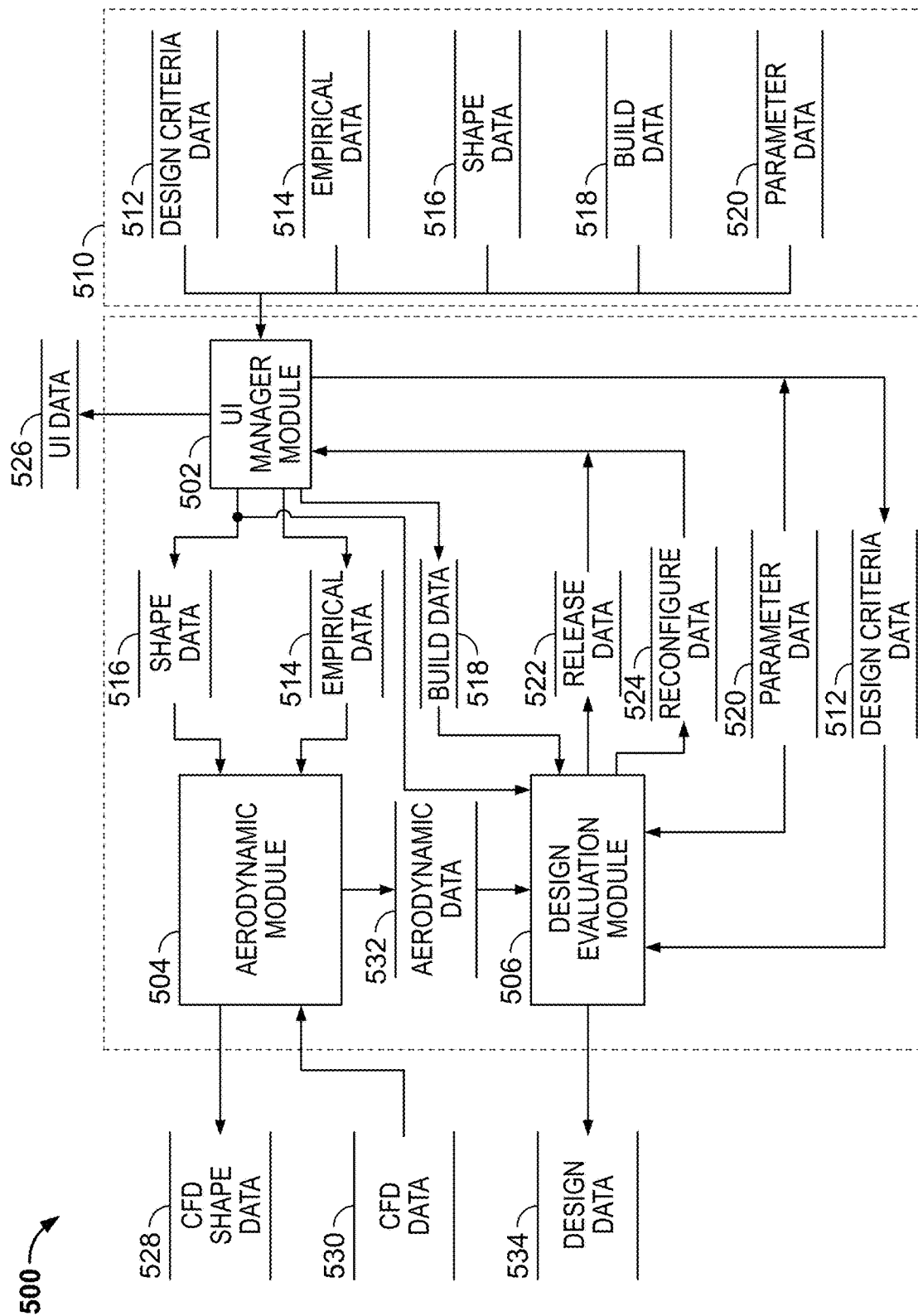
FIG. 15 is a dataflow diagram illustrating a stator manufacturing system of the system of FIG. 14, in accordance with various embodiments.

As shown in more detail with regard to FIG. 15, and with continued reference to FIG. 14, a dataflow diagram illustrates various embodiments of a stator manufacturing system 500 of the system 400, which may be embedded within the controller 404. Various embodiments of the stator manufacturing system 500 according to the present disclosure can include any number of sub-modules embedded within the controller 404. As can be appreciated, the sub-modules shown in FIG. 15 may be combined and/or further partitioned to similarly receive data from the human-machine interface 406, and output data to one or more user interfaces. Inputs to the stator manufacturing system 500 may be received from the human-machine interface 406 (FIG. 14), received from other control modules (not shown) associated with the system 400, and/or determined/modeled by other sub-modules (not shown) within the controller 404. In various embodiments, with reference to FIG. 15, the stator manufacturing system 500 includes a user interface (UI) manager module 502, an aerodynamic module 504, and a design evaluation module 506.

The (UI) manager module 502 receives input data 510. The input data 510 is received from the human-machine interface 406 via the user's interaction with the human-machine interface 406, for example, the user's interaction with the touchscreen interface 410a. In one example, the input data 510 includes design criteria data 512, empirical data 514, shape data 516, build data 518 and parameter data 520. The design criteria data 512 is data entered via the input device 410 that provides the design requirements for the stator 146a-146d. For example, the design criteria data 512 includes blade row pressure losses and airflow turning deviation, with airflow turning deviation defined as the difference between an airfoil exit metal angle and an air angle at spanwise sections from hub to shroud. The airfoil exit metal angle is defined as the angle between a reference line that is tangent to a mean camber line of the airfoil 170 at the trailing edge 178 and a reference line that is parallel to the engine center line or the longitudinal axis 139 of the gas turbine engine 100 (FIG. 1) and normal to the direction of rotation. The air angle is angle of the air at the trailing edge 178. The design criteria data 512 may also include the acceptable manufacturing variation, acceptable cost to manufacture and acceptable weight of the respective stator 146a-146d. It should be noted that the design criteria data 512 may also include other predetermined criteria, if desired.

The empirical data 514 is data that provides the aerodynamic benefit provided by the first local vortex generator array 202 and the second local vortex generator array 204 defined on the airfoil 170 of the stator 146a-146d. The shape data 516 is data that provides a shape and location for the first local vortex generator array 202 and the second local vortex generator array 204, a shape and a location for the airfoil 170, a shape and location for the shroud 160 and a shape and a location for the hub 162. For example, the shape data 516 provides the geometric shape of the shroud 160, the hub 162 and the airfoil 170, with the geometric shape and location of respective one of the patterns 230, 246, 256, 266, 278, 288, 298, 304, 314, including the geometric shape and location of the respective flow structures 232, 234, 240, 242, 250, 252, 260, 262, 270, 272, 274, 276, 280, 282, 284, 286, 290, 292, 294, 300, 302, 310, 312. The build data 518 is data that provides the manufacturing process for the stator 146a-146d to include the first local vortex generator array 202 and the second local vortex generator array 204, and also includes the manufacturing capabilities of the manufacturing system 408. The parameter data 520 is data that provides a manufacturing time per cost and a manufacturing geometry accuracy for manufacturing the first local vortex generator array 202 and the second local vortex generator array 204 on the stator 146a-146d using the manufacturing system 408. It should be noted that while the input data 510 is described as including the design criteria data 512, the empirical data 514, the shape data 516, the build data 518 and the parameter data 520, one or more of the design criteria data 512, the empirical data 514, the shape data 516, the build data 518 and the parameter data 520 may be received from other modules associated with the controller 404.

The UI manager module 502 processes the input data 510, and based on the input data 510, the UI manager module 502 sets the shape data 516 and the empirical data 514 for the aerodynamic module 504. The UI manager module 502 processes the input data 510, and sets the build data 518, the parameter data 520 and the design criteria data 512 for the design evaluation module 506. The UI manager module 502 also receives as input release data 522 and reconfigure data 524 from the design evaluation module 506. The release data 522 is data that the stator 146a-146d with the first local vortex generator array 202 and the second local vortex generator array 204 is acceptable to release for manufacturing to the manufacturing system 408. The reconfigure data 524 is data that the stator 146a-146d is unacceptable to manufacture with the first local vortex generator array 202 and the second local vortex generator array 204.

Based on the release data 522 and the reconfigure data 524, the UI manager module 502 outputs user interface data 526 for rendering on the display 412. In one example, based on the release data 522, the UI manager module 502 outputs a textual and/or graphical notification for rendering on the display 412 that the stator 146a-146d with the first local vortex generator array 202 and the second local vortex generator array 204 is acceptable to manufacture. Based on the reconfigure data 524, the UI manager module 502 outputs a textual and/or graphical notification for rendering on the display 412 that the stator 146a-146d with the first local vortex generator array 202 and the second local vortex generator array 204 is unacceptable to manufacture and may include a prompt to reconfigure the shape and/or location of the first local vortex generator array 202 and the second local vortex generator array 204 and/or to reconfigure the shape of the stator 146a-146d.

The aerodynamic module 504 receives as input the shape data 516. In one example, the aerodynamic module 504 sets CFD shape data 528 for a module associated with the controller 404. For example, the aerodynamic module 504 sets the CFD shape data 528 for a computational fluid dynamics module associated with the controller 404. The CFD shape data 528 includes the shape data 516, for processing by the computational fluid dynamics module to determine the aerodynamic benefit of the stator 146a-146d with the first local vortex generator array 202 and the second local vortex generator array 204. The aerodynamic module 504 receives as input CFD data 530. The CFD data 530 is the data from the computational fluid dynamics module that provides the aerodynamic benefit derived from the shape of the stator 146a-146d with the first local vortex generator array 202 and the second local vortex generator array 204. The aerodynamic module 504 also receives as input the empirical data 514. The aerodynamic module 504 sets aerodynamic data 532 for the design evaluation module 506. The aerodynamic data 532 is the aerodynamic benefit of the stator 146a-146d with the first local vortex generator array 202 and the second local vortex generator array 204 provided by the CFD data 530, the empirical data 514 or both the CFD data 530 and the empirical data 514. In one example, the aerodynamic module 504 augments the empirical data 514 with the CFD data 530.

The design evaluation module 506 receives as input the shape data 516, the build data 518, the parameter data 520 and the design criteria data 512. The design evaluation module 506 also receives as input the aerodynamic data 532. The design evaluation module 506 compares the build data 518, the parameter data 520 and the aerodynamic data 532 to the design criteria data 512. If the build data 518, the parameter data 520 and the aerodynamic data 532 meets the design requirements set forth in the design criteria data 512, the design evaluation module 506 outputs design data 534 for the manufacturing system 408 and sets the release data 522 for the UI manager module 502. The design data 534 includes the shape data 516 and the build data 518 for the manufacturing system 408 for the manufacturing or forming of the stator 146a-146d with the first local vortex generator array 202 and the second local vortex generator array 204. Based on the design data 534, the manufacturing system 408 forms the stator 146a-146d with the first local vortex generator array 202 and the second local vortex generator array 204 via additive manufacturing, by outputting one or more control signals to the laser associated with the manufacturing system 408, as discussed. If the build data 518, the parameter data 520 and the aerodynamic data 532 does not meet the design requirements set forth in the design criteria data 512, the design evaluation module 506 sets the reconfigure data 524 for the UI manager module 502.

Figure 16:
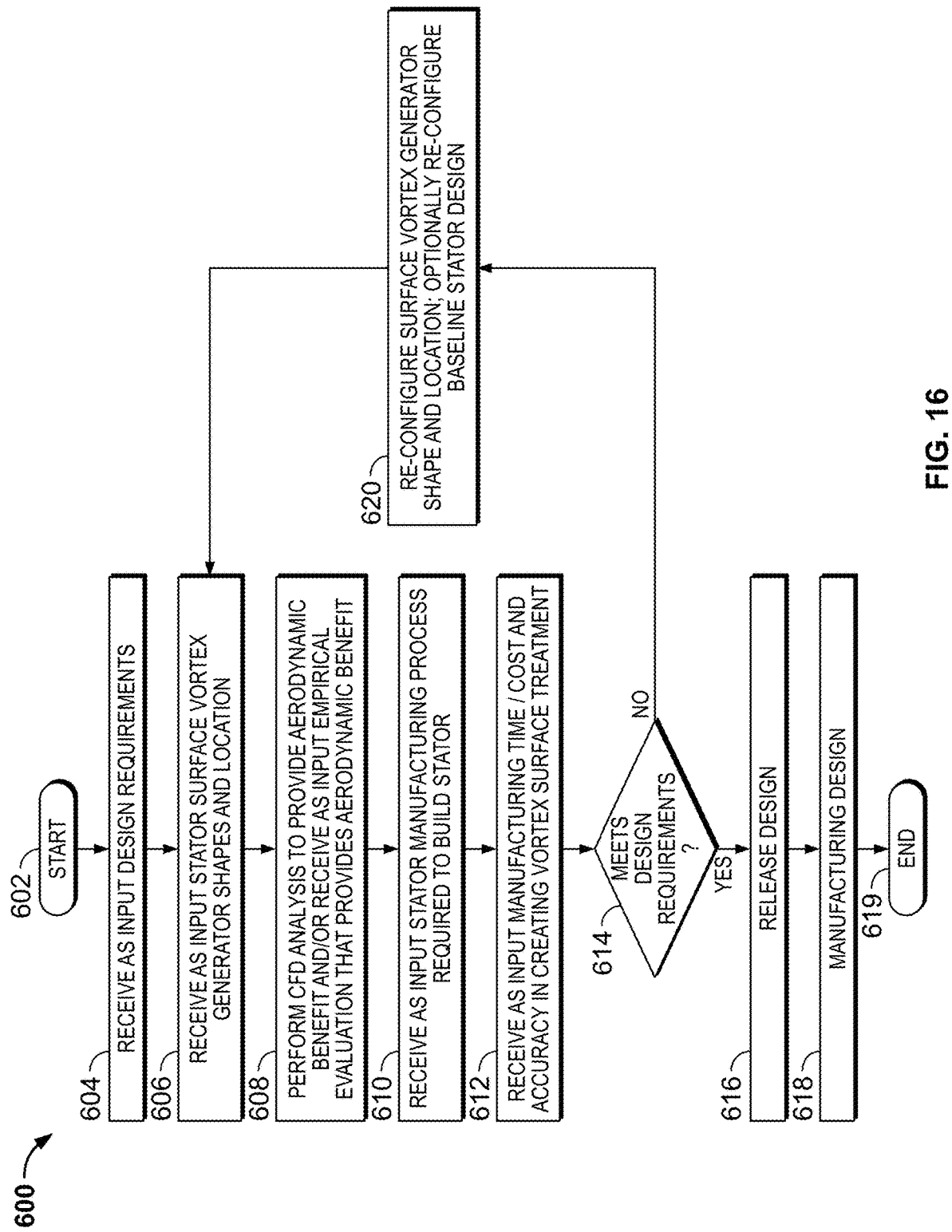
FIG. 16 is a flowchart illustrating a method for the stator manufacturing system of the system of FIG. 14, in accordance with various embodiments.

Referring now to FIG. 16, and with continued reference to FIGS. 14 and 15, a flowchart illustrates a method 600 that can be performed by the stator manufacturing system 500 of FIG. 14 of the system 400 in accordance with the present disclosure. In various embodiments, the method 600 is performed by the processor 420 of the controller 404. As can be appreciated in light of the disclosure, the order of operation within the method is not limited to the sequential execution as illustrated in FIG. 16, but may be performed in one or more varying orders as applicable and in accordance with the present disclosure. In various embodiments, the method 600 can be scheduled to run based on one or more predetermined events, such as based on the receipt of the input data 510.

The method begins at 602. At 604, the method receives as input the design requirements, or receives as input the design criteria data 512. At 606, the method receives as input stator surface vortex generation shapes and locations, or receives as input the shape data 516. At 608, method performs computational fluid analysis on the shape data 516 to provide the aerodynamic benefit, receives the empirical data 514 that provides the aerodynamic benefit for the stator 146a-146d with the first local vortex generator array 202 and the second local vortex generator array 204 or receives both computational fluid analysis on the shape data 516 to provide the aerodynamic benefit and the empirical data 514 that provides the aerodynamic benefit for the stator 146a-146d with the first local vortex generator array 202 and the second local vortex generator array 204. At 610, the method receives as input the manufacturing process required to build the stator 146a-146d with the first local vortex generator array 202 and the second local vortex generator array 204 using the manufacturing system 408, including the manufacturing capabilities of the manufacturing system 408, or receives the build data 518. At 612, the method receives as input the manufacturing time per cost and manufacturing accuracy in creating the first local vortex generator array 202 and the second local vortex generator array 204 on the stator 146a-146d or receives the parameter data 520. At 614, the method determines whether the aerodynamic benefit, the manufacturing time per cost and manufacturing geometry accuracy in creating the first local vortex generator array 202 and the second local vortex generator array 204, and the manufacturing process required to build the stator 146a-146d with the first local vortex generator array 202 and the second local vortex generator array 204 with the manufacturing system 408 meets the design requirements received as the design criteria data 512. For example, the method determines whether the acceptable cost to manufacture the stator 146a-146d comports with the manufacturing time per cost. The method determines whether the acceptable manufacturing variation comports with the manufacturing geometry accuracy. The method determines whether the blade row pressure losses and airflow turning deviation comports with the aerodynamic data 532.

If true, the method releases the design for the stator 146a-146d with the first local vortex generator array 202 and the second local vortex generator array 204 for the manufacturing system 408 at 616. At 618, the method manufactures the stator 146a-146d with the first local vortex generator array 202 and the second local vortex generator array 204 based on the design, via controlling the laser associated with the manufacturing system 408 based on the design data 534 for example, and ends at 619. If false, the method proceeds to 620. At 620, the method outputs a notification and/or prompt for rendering on the display 412 to reconfigure the shape and/or location of the first local vortex generator array 202 and the second local vortex generator array 204; and/or to reconfigure the shape of the stator 146a-146d. The method loops to 606.

Thus, the first local vortex generator array 202 and the second local vortex generator array 204 defined on one or more of the stators 146a-146d controls boundary layer growth and minimizes secondary losses by introducing vorticity into the airflow downstream of the leading edge 176 to control the area of diffusion. By controlling the area of diffusion through the first local vortex generator array 202 and the second local vortex generator array 204, secondary losses are reduced and the boundary layer is strengthened, which minimizes flow deviation. The first local vortex generator array 202 and the second local vortex generator array 204 defined on or integrally formed with one or more of the stators 146a-146d reduces specific fuel consumption and enables an increase in cycle pressure ratios in the compressor section 104. In addition, the airfoils 170 generate less pressure drop and turn the air with less deviation (less difference between the air angle and the metal angle at the trailing edge 178 of the airfoil 170). The first local vortex generator array 202 and the second local vortex generator array 204 also reduce turbine inlet temperatures. In this regard, the inlet temperature of the turbine section 108 is reduced when less temperature rise (work input by the compressor section 104) is required as airfoil losses are reduced by the first local vortex generator array 202 and the second local vortex generator array 204 while achieving the predefined pressure ratio. In addition, the first local vortex generator array 202 and the second local vortex generator array 204 defined on one or more of the stators 146a-146d result in reduced fuel burn due to the reduced pressure losses.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A turbomachine comprising:
   a shroud;
   a hub spaced apart from the shroud, the hub and the shroud configured to channel an airflow along a direction;
   a plurality of airfoils coupled between the shroud and the hub, at least one airfoil of the plurality of airfoils including a leading edge spaced apart from a trailing edge in the direction of the airflow, a pressure side opposite a suction side, and a span defined as 0% at the hub and 100% at the shroud; and
   a plurality of local vortex generator arrays defined on the suction side so as to extend onto the hub or the shroud, the plurality of local vortex generator arrays defined downstream of the leading edge, the plurality of local vortex generator arrays include at least a plurality of first flow features and a plurality of second flow features arranged in pairs, and one of the plurality of local vortex generator arrays is defined on the suction side between 0% span and less than or equal to 40% span.

2. The turbomachine of claim 1, wherein the plurality of first flow features and the plurality of second flow features extend outwardly into the airflow from the suction side, the hub, or the shroud.

3. The turbomachine of claim 1, wherein the plurality of first flow features and the plurality of second flow features are recessed into the suction side, the hub, or the shroud.

4. The turbomachine of claim 1, wherein the plurality of first flow features and the plurality of second flow features are arranged in a repeatable pattern.

5. The turbomachine of claim 1, wherein the plurality of first flow features and the plurality of second flow features are arranged in an alternating pattern.

6. A turbomachine comprising:
   a shroud;
   a hub spaced apart from the shroud, the hub and the shroud configured to channel an airflow along a direction;
   a plurality of airfoils coupled between the shroud and the hub, at least one airfoil of the plurality of airfoils including a leading edge spaced apart from a trailing edge in the direction of the airflow, a pressure side opposite a suction side, and the at least one airfoil has a span defined as 0% at the hub and 100% at the shroud; and
   a first local vortex generator array defined on the suction side and the shroud, the first local vortex generator array is defined downstream of the leading edge, and the first local vortex generator array is defined on the suction side between greater than or equal to 60% span and 100% span.

7. The turbomachine of claim 6, further comprising a second local vortex generator array defined on the suction side and the hub.

8. The turbomachine of claim 7, wherein the at least one airfoil includes a fillet defined at the suction side and the shroud, and a second fillet defined at the suction side and the hub, and the first local vortex generator array is discontinuous at the fillet and the second vortex generator array is discontinuous at the second fillet.

9. The turbomachine of claim 7, wherein the second local vortex generator array is defined on the suction side between 0% span and less than or equal to 40% span.

10. The turbomachine of claim 7, wherein the at least one airfoil has a chord that is 0% chord at the leading edge and 100% chord at the trailing edge, and the second local vortex generator array is defined on the suction side between 1% chord to 50% chord and is defined on the hub between 0% chord to −10% chord at 0% span.

11. The turbomachine of claim 7, wherein a distance is defined between adjacent ones of the plurality of airfoils along the shroud and a second distance is defined between the adjacent ones of the plurality of airfoils along the hub, the first local vortex generator array extends along the shroud from the suction side of the at least one airfoil for 60% of the distance and the second local vortex generator array extends along the hub from the suction side of the at least one airfoil for 60% of the second distance.

12. The turbomachine of claim 11, wherein the first local vortex generator array extends along the shroud from the pressure side of the at least one airfoil for 20% of the distance and the second local vortex generator array extends along the hub from the pressure side of the at least one airfoil for 20% of the second distance.

13. The turbomachine of claim 6, wherein the at least one airfoil has a chord that is 0% chord at the leading edge and 100% chord at the trailing edge, and the first local vortex generator array is defined on the suction side between 1% chord to 50% chord.

14. The turbomachine of claim 13, wherein the first local vortex generator array is defined on the shroud between 0% chord to −10% chord at 100% span.

15. A method for manufacturing a stator for a turbomachine, the stator including at least one local vortex generator array, the method comprising:
   receiving, by a processor, design criteria for the stator, the stator including a shroud, a hub, and a plurality of airfoils that each extend between the shroud and the hub in the spanwise direction, at least one airfoil of the plurality of airfoils including a leading edge spaced apart from a trailing edge in a chordwise direction and a pressure side opposite a suction side, and the design criteria including blade row pressure losses and airflow turning deviation for the stator;
   receiving, by the processor, a shape, and a location of the at least one local vortex generator array defined on the suction side of the at least one airfoil and at least one of the hub and the shroud;
   determining, by the processor, whether the shape and location of the at least one local vortex generator array defined on the suction side of the at least one airfoil and the at least one of the hub and the shroud meets the blade row pressure losses and the airflow turning deviation associated with the design criteria for the stator, the at least one local vortex generator array including a first local vortex generator array defined on the suction side and the shroud; and
   manufacturing the stator including the at least one local vortex generator array based on the determining.

16. The method of claim 15, wherein the at least one local vortex generator array further comprises a second local vortex generator array defined on the suction side of the at least one airfoil and the hub, and wherein receiving, by the processor, the shape and location of the at least one local vortex generator array further comprises:
   receiving, by the processor, a location of the first local vortex generator array on the suction side as between 1% chord to 50% chord in the chordwise direction and between greater than or equal to 60% span and 100% span in the spanwise direction; and receiving, by the processor, a location of the second local vortex generator array on the suction side as between 1% chord to 50% chord in the chordwise direction and between less than or equal to 40% span and 0% span in the spanwise direction.

17. The method of claim 16, wherein the receiving, by the processor, the shape and location further comprises:

receiving, by the processor, a location of the first local vortex generator array on the shroud as between 0% chord to −10% chord in the chordwise direction at 100% span and up to 60% of a distance defined on the shroud from the suction side of the at least one airfoil to an adjacent airfoil of the plurality of airfoils; and receiving, by the processor, a location of the second local vortex generator array on the hub as between 0% chord to −10% chord in the chordwise direction at 0% span and up to 60% of a second distance defined on the hub from the suction side of the at least one airfoil to the adjacent airfoil of the plurality of airfoils.

18. The method of claim 16, wherein the receiving, by the processor, the shape and location further comprises:

receiving, by the processor, a location of the first local vortex generator array on the shroud as between 0% chord to −10% chord in the chordwise direction at 100% span and up to 20% of a distance defined on the shroud from the pressure side of the at least one airfoil to an adjacent airfoil of the plurality of airfoils; and receiving, by the processor, a location of the second local vortex generator array on the hub as between 0% chord to −10% chord in the chordwise direction at 0% span and up to 20% of a second distance defined on the hub from the pressure side of the at least one airfoil to the adjacent airfoil of the plurality of airfoils.

* * * * *